(12) United States Patent
Velásquez-García et al.

(10) Patent No.: US 9,669,416 B2
(45) Date of Patent: Jun. 6, 2017

(54) ELECTROSPRAYING SYSTEMS AND ASSOCIATED METHODS

(71) Applicant: Massachusetts Institute of Technology, Cambridge, MA (US)

(72) Inventors: Luis Fernando Velásquez-García, Newton, MA (US); Frances Ann Hill, Cambridge, MA (US); Philip James Ponce De Leon, Shenorock, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 231 days.

(21) Appl. No.: 13/918,742

(22) Filed: Jun. 14, 2013

(65) Prior Publication Data

US 2014/0353397 A1  Dec. 4, 2014

Related U.S. Application Data

(60) Provisional application No. 61/827,893, filed on May 28, 2013, provisional application No. 61/827,905, filed on May 28, 2013.

(51) Int. Cl.
*B05B 1/14* (2006.01)
*B05D 1/04* (2006.01)
*H01L 21/62* (2006.01)
*B05B 5/025* (2006.01)
*B05D 1/00* (2006.01)
*D01D 5/00* (2006.01)
(Continued)

(52) U.S. Cl.
CPC .............. *B05B 5/0255* (2013.01); *B05B 1/14* (2013.01); *B05B 5/025* (2013.01); *B05B 5/0536* (2013.01); *B05D 1/007* (2013.01); *B82Y 30/00* (2013.01); *D01D 5/0069* (2013.01)

(58) Field of Classification Search
CPC ..... B05B 5/025; B05B 5/0255; B05B 5/0536; B05B 1/14; B05D 1/04; B05D 51/00; H01L 21/62
USPC ............. 239/690, 548; 425/174.8 E; 257/10; 438/20, 79; 977/720, 939, 842
See application file for complete search history.

(56) References Cited

U.S. PATENT DOCUMENTS

| | | |
|---|---|---|
| 5,624,875 A | 4/1997 | Nakanishi et al. |
| 6,068,882 A | 5/2000 | Ryu |
| 6,288,390 B1 | 9/2001 | Siuzdak et al. |

(Continued)

FOREIGN PATENT DOCUMENTS

| | | |
|---|---|---|
| WO | WO 02/055990 A2 | 7/2002 |
| WO | WO 2006/009854 A2 | 1/2006 |

(Continued)

OTHER PUBLICATIONS

Hill et al., High-Throughput Ionic Liquid Electrospray Sources Based on Dense Monolithic Arrays of Emitters with Integrated Extractor Grid and Carbon Nanotube Flow Control Structures. Technical Digest of the 17th International Conference on Solid-State Sensors Actuators, and Microsystems. Barcelona, Spain. Jun. 16-20, 2013.

(Continued)

*Primary Examiner* — Arthur O Hall
*Assistant Examiner* — Joseph A Greenlund
(74) *Attorney, Agent, or Firm* — Wolf, Greenfield & Sacks, P.C.

(57) ABSTRACT

Electrospraying systems and associated methods are generally described.

19 Claims, 18 Drawing Sheets

(51) Int. Cl.
  *B82Y 30/00* (2011.01)
  *B05B 5/053* (2006.01)

(56) References Cited

U.S. PATENT DOCUMENTS

| | | | | |
|---|---|---|---|---|
| 6,297,499 | B1* | 10/2001 | Fenn | H01J 49/167 250/288 |
| 6,707,035 | B2 | 3/2004 | Hughey et al. | |
| 6,768,119 | B2 | 7/2004 | de la Mora et al. | |
| 6,867,415 | B2 | 3/2005 | Hughey et al. | |
| 7,015,046 | B2 | 3/2006 | Wohlstadter et al. | |
| 7,097,781 | B2 | 8/2006 | Asakawa et al. | |
| 7,129,513 | B2* | 10/2006 | Zhou | H01J 27/26 257/10 |
| 7,199,364 | B2 | 4/2007 | Thakur | |
| 7,335,897 | B2 | 2/2008 | Takats et al. | |
| 7,397,032 | B2* | 7/2008 | Zona | G03G 15/0291 250/326 |
| 7,517,479 | B2 | 4/2009 | Bango et al. | |
| 7,696,489 | B2 | 4/2010 | Pilz et al. | |
| 7,863,581 | B2* | 1/2011 | Lozano | H01J 27/028 250/423 F |
| 7,932,492 | B2 | 4/2011 | Demmons et al. | |
| 8,030,621 | B2 | 10/2011 | Lozano et al. | |
| 8,080,930 | B2* | 12/2011 | King | F03H 1/00 250/423 R |
| 8,084,735 | B2 | 12/2011 | Kertesz et al. | |
| 8,198,106 | B2* | 6/2012 | Akinwande | H01J 1/3042 257/10 |
| 8,207,496 | B2* | 6/2012 | Makarov | H01J 49/167 210/748.01 |
| 8,227,765 | B2* | 7/2012 | Syms | H01J 49/0018 250/281 |
| 8,272,345 | B2* | 9/2012 | Robertson | B05B 1/14 118/313 |
| 8,324,593 | B2* | 12/2012 | Lozano | F03H 1/0012 250/281 |
| 8,368,295 | B2* | 2/2013 | Wei | H01J 1/304 313/309 |
| 8,394,877 | B2 | 3/2013 | Asakawa et al. | |
| 8,722,323 | B2* | 5/2014 | Wohlstadter | B01L 3/5027 204/403.01 |
| 8,785,881 | B2 | 7/2014 | Lozano et al. | |
| 8,791,411 | B2* | 7/2014 | Lozano | H01J 37/08 250/281 |
| 8,850,792 | B2* | 10/2014 | Marrese-Reading | B64G 1/405 60/200.1 |
| 9,358,556 | B2* | 6/2016 | Velasquez-Garcia | B05B 1/14 |
| 9,362,097 | B2* | 6/2016 | Lozano | H01J 37/08 |
| 9,478,403 | B2 | 10/2016 | Lozano et al. | |
| 2004/0194305 | A1 | 10/2004 | deRochemont et al. | |
| 2005/0131163 | A1 | 6/2005 | Rhine et al. | |
| 2005/0133372 | A1* | 6/2005 | Zhou | B82Y 30/00 204/471 |
| 2005/0269559 | A1* | 12/2005 | Zhou | H01J 27/26 257/10 |
| 2005/0281379 | A1* | 12/2005 | Qiu | B82Y 10/00 378/122 |
| 2007/0170056 | A1 | 7/2007 | Arnold et al. | |
| 2007/0235647 | A1 | 10/2007 | Zona et al. | |
| 2008/0051881 | A1 | 2/2008 | Feng et al. | |
| 2008/0131615 | A1 | 6/2008 | Robertson et al. | |
| 2008/0307766 | A1* | 12/2008 | Petras | D01D 5/0069 57/402 |
| 2009/0032724 | A1 | 2/2009 | Lozano et al. | |
| 2009/0072750 | A1 | 3/2009 | Akinwande et al. | |
| 2009/0114838 | A1 | 5/2009 | Lozano et al. | |
| 2009/0130380 | A1 | 5/2009 | Asakawa et al. | |
| 2009/0224679 | A1 | 9/2009 | Pan et al. | |
| 2009/0283824 | A1 | 11/2009 | Knight et al. | |
| 2009/0309481 | A1* | 12/2009 | Chou et al. | 313/483 |
| 2010/0139823 | A1 | 6/2010 | Gash et al. | |
| 2010/0201251 | A1* | 8/2010 | Park | B82Y 10/00 313/496 |
| 2010/0284735 | A1 | 11/2010 | Sievers et al. | |
| 2010/0289413 | A1 | 11/2010 | Eden et al. | |
| 2011/0037102 | A1 | 2/2011 | Tchertchian et al. | |
| 2011/0079138 | A1 | 4/2011 | Storrie et al. | |
| 2011/0079188 | A1 | 4/2011 | Meintschel et al. | |
| 2011/0124116 | A1 | 5/2011 | Wohlstadter et al. | |
| 2011/0126929 | A1* | 6/2011 | Velasquez-Garcia | B01L 3/0268 137/561 R |
| 2011/0150765 | A1 | 6/2011 | Boyden et al. | |
| 2011/0210265 | A1 | 9/2011 | Lozano et al. | |
| 2011/0284735 | A1 | 11/2011 | Van Berkel et al. | |
| 2012/0037595 | A1 | 2/2012 | Asakawa et al. | |
| 2012/0045863 | A1 | 2/2012 | Hopwood | |
| 2012/0104554 | A1 | 5/2012 | Eden et al. | |
| 2012/0119079 | A1 | 5/2012 | Ouyang et al. | |
| 2012/0144796 | A1* | 6/2012 | Marrese-Reading et al. | 60/202 |
| 2012/0189836 | A1 | 7/2012 | Kruglick | |
| 2012/0244291 | A1 | 9/2012 | Bisht et al. | |
| 2012/0301981 | A1* | 11/2012 | Ozgur | H01J 1/304 438/20 |
| 2013/0098774 | A1 | 4/2013 | Lozano et al. | |
| 2013/0113370 | A1 | 5/2013 | Tabib-Azar et al. | |
| 2013/0228700 | A1 | 9/2013 | Lozano et al. | |
| 2013/0241115 | A1* | 9/2013 | Sharma | D01D 5/0038 264/465 |
| 2014/0054809 | A1 | 2/2014 | Lozano et al. | |
| 2014/0110661 | A1* | 4/2014 | Wang | H01J 49/0018 257/10 |
| 2014/0284406 | A1* | 9/2014 | Brekenfeld | B05B 5/0255 239/696 |
| 2014/0292180 | A1* | 10/2014 | Park | H01J 9/025 313/309 |
| 2014/0353860 | A1 | 12/2014 | Velásquez-García et al. | |
| 2015/0060757 | A1* | 3/2015 | Lee | H01J 9/025 257/10 |
| 2015/0061487 | A1* | 3/2015 | Sharifi | C25F 3/02 313/336 |
| 2015/0170865 | A1 | 6/2015 | Lozano et al. | |
| 2015/0255241 | A1* | 9/2015 | Bonam | H01J 37/073 250/494.1 |
| 2016/0096185 | A1* | 4/2016 | Nobuo | H01L 51/0006 438/46 |
| 2016/0107178 | A1* | 4/2016 | Velasquez-Garcia | B05B 1/14 239/3 |
| 2016/0111242 | A1 | 4/2016 | Lozano et al. | |
| 2016/0297549 | A1 | 10/2016 | Lozano et al. | |
| 2016/0318048 | A1 | 11/2016 | Velásquez-García et al. | |

FOREIGN PATENT DOCUMENTS

| | | |
|---|---|---|
| WO | WO 2007/002170 A2 | 1/2007 |
| WO | WO 2009/023257 A1 | 2/2009 |
| WO | WO 2009/039338 A1 | 3/2009 |
| WO | WO 2009/137583 A2 | 11/2009 |
| WO | WO 2011/079138 A2 | 6/2011 |
| WO | WO 2012/078043 A1 | 6/2012 |
| WO | WO 2013/003795 A1 | 1/2013 |
| WO | WO 2013/016497 A2 | 1/2013 |

OTHER PUBLICATIONS

Ponce De Leon et al., Batch-Microfabricated Arrays of Electrospinning Emitters for High Throughput Generation of Nanofibers. Technical Digest of the 12th International Workshop on Micro and Nanotechnology for Power Generation and Energy Conversion Applications. Atlanta GA, USA. pp. 227-230, Dec. 2-5, 2012.

International Search Report and Written Opinion dated Oct. 9, 2014 for PCT/US2014/039851.

U.S. Appl. No. 13/918,759, filed Jun. 14, 2013, Velásquez-García et al.

Burger et al., Nanofibrous materials and their applications. Annu. Rev. Mater. Res., No. 36 pp. 333-368, 2006.

Chang et al., Continuous near-field electrospinning for large area deposition of orderly nanofiber patterns. Appl. Phys. Lett. 93:123111 (2008).

(56) References Cited

OTHER PUBLICATIONS

Deitzel et al., Controlled deposition of electrospun poly( ethylene oxide) fibers Polymer No. 42 pp. 8163-8170, 2001.
Doshi et al., Electrospinning process and applications of electrospun fibers, J Electrost. No. 35, pp. 151-160, 1995.
Fernandez De La Mora, The Current Emitted by Highly Conductive Taylor Cones, J Fluid Mech. , vol. 260, pp. 155- 184, 1994.
Fernandez De La Mora, The Fluid Dynamics of Taylor Cones, Annual Review of Fluid Mechanics, vol. 39: pp. 217-243 (2007).
Gassend et al., A Microfabricated Planar Electrospray Array Ionic Liquid Ion Source with Integrated Extractor, J. of Microelectromechanical Systems, vol. 18, No. 3, pp. 679-694, 2009.
Gassend et al., Precision In-Plane Hand Assembly of Bulk-Microfabricated Components for High Voltage MEMS Arrays Applications, J of Microelectromechanical Systems, vol. 18, No. 2, pp. 332-326 (2009).
Gibson et al., Transport properties of porous membranes based on electrospun fibers, Colloids and Surfaces A: Physicochemical and Engineering Aspects, No. 187-188, pp. 469-481 (2001).
Ishino et al., Wicking within forests of micropillars, Europhysics Letters 79:56005 (2007).
Krpoun et al., Tailoring the hydraulic impedance of out-of-plane micromachined electrospray sources with integratedelectrodes. Appl. Phys. Lett., vol. 94, 2009.
Larrondo et al., Electrostatic fiber spinning from polymer melts—1. Experimental-observations on fiber formation and properties, J Polym. Sci. B 1No. 9, pp. 909-920 (1981).
Larsen et al., Use of Coaxial Gas Jackets to Stabilize Taylor Cones of Volatile Solutions and to Induce Particle-to-Fiber Transitions, Adv Mater vol. 16, No. 2, 166-169, (2004).
Lee et al., Developing protective textile materials as barriers to liquid penetration using melt electrospinning, Journal of Applied Polymer Science, vol. 102, pp. 3430-3437, (2006).
Legge et al., Electrospray propulsion based on emitters microfabricated in porous metals, J. Propul. Power, vol. 27, pp. 485-494, 2011.
Li et al., Electrospinning of nanofibers: reinventing the wheel? Advanced Materials, vol. 16, pp. 1151-1170, 2004.
Lin et al., Preparation of poly( ether sulfone) nanofibers by gas-jet/electrospinning, Journal of Applied Polymer Science, vol. 107, pp. 909-917, 2008.
Lozano et al., Ionic liquid ion sources: characterization of externally wetted emitters, J. Colloid Interf. Sci., vol. 282, pp. 415-421, 2005.
Lukas et al., Self-organization of jets in electrospinning from free liquid surface: A generalized approach J. Appl. Phys. 103:084309 (2008).
Paruchuri et al., Splitting of a Liquid Jet. Phys. Rev. Lett. vol. 98:134502, 2007.
Petrik et al., Production Nozzle-Less Electrospinning Nanofiber Technology. MRS Proceedings. 1240 1240-WW03-07 doi:10.1557/PROC-1240-WW03-07 (2009). 12 pages.
Podenok et al., Electric Field Enhancement Factors Around a Metallic, End-Capped Cylinder NANO 01 87-93 (2006).
Quéré, Wetting and Roughness. Annu. Rev. Mater. Res. 2008;38:71-99.
Reneker et al., Electrospinning jets and polymer nanofibers, Polymer, vol. 49, pp. 2387-2425, 2008.
Romero-Sanz et al., Source of heavy molecular ions based on Taylor cones of ionic liquids operating in the pure ion evaporation regime, J. Appl. Phys., vol. 94, pp. 3599-3605, 2003.
Seiwert et al., Coating of a textured solid. J. Fluid Mech. 669 55 (2011).
Srinivasan et al., Structure and Morphology of small diameter electrospun aramid fibers, Polymer International, No. 36, pp. 195-201, 1995.
Srivastava et al., Multi-jet electrospinning of conducting nanofibers from microfluidic manifolds, J Appl. Polymer Sci. vol. 106 pp. 3171-3178, 2007.
Taylor, Disintegration of Water Drops in an Electric Field. Proc. R. Soc. London A 280 (1964) 383-397.
Teo et al., Uniform patterned growth of carbon nanotubes without surface carbon, Appl. Phys. Lett., vol. 79, pp. 1534-1536 (2001).
Thavasi et al., Electrospun Nanofibers in Energy and Environmental Applications. Energy Environ. Sci. 1 205-221. (2008).
Theron et al., Multiple jets in electrospinning: experiment and modeling, Polymer 46 2889-2899 (2005).
Tomaszewski et al., Investigation of electrospinning with the use of a multi-jet electrospinning head, Fibres & Textiles in Eastern Europe, vol. 13, pp. 22-26, 2005.
Vaseashta, Controlled formation of multiple Taylor cones in electrospinning process, Applied Physics Letters, vol. 90, No. 9, 093115 (2007).
Velasquez-Garcia et al., A Micro-fabricated Linear Array of Electrospray Emitters for Thruster Applications, J. of Microelectromechanical Systems, vol. 15, No. 5, pp. 1260-1271 (2006).
Velasquez-Garcia et al., A Planar Array of Micro-fabricated Electrospray Emitters for Thruster Applications, J. of Microelectromechanical Systems, vol. 15, No. 5, pp. 1272-1280 (2006).
Velasquez-Garcia et al., An Application of 3D MEMS Packaging: Out-Of-Plane Quadrupole Mass Filters, Journal of Microelectromechanical Systems, vol. 16, No. 6, pp. 1430-1438 (2008).
Velasquez-Garcia et al., CNT-based MEMS Ionizers for Portable Mass Spectrometry Applications, J. of Microelectromechanical Systems, vol. 19,No. 3,pp. 484-493 (2010).
Velasquez-Garcia et al., Precision Hand Assembly of MEMS subsystems using DRIB-patterned deflection Spring Structures: An Example of an Out-of-plane Substrate Assembly, J of Microelectromechanical Systems, vol. 16, No. 3, pp. 598-612, Jun. 2007.
Xiao et al., Prediction and Optimization of Liquid Propagation in Micropillar Arrays, Langmuir 26 15070-15075 (2010).
Yang et al., Multiple Jets in Electrospinning Proceedings of the 8th International conference on properties and applications of dielectric materials, pp. 940-943 (2006).
Yarin et al., Upward needleless electrospinning of multiple nanofibers, Polymer, vol. 45, pp. 2977-2980 (2004).
Yoshihiro et al., Characteristics of elastomeric nanofiber membranes produces by electrospinning, Journal of Textile Engineering, vol. 53, No. 4, (2007). 10 pages.
Zhou et al., Gas flow-assisted alignment of super long electrospun nanofibers, J Nanosci. Nanotechnol. vol. 7, No. 8, pp. 2667-2673 (2007).
Zhou et al., Mass production of nanofiber assemblies by electrospinning, Polym Int, No. 58, pp. 331-342 (2009).
Zong et al., Control of structure, morphology and property in electrospun poly(glycolide-co-lactide) non-woven membranes via postdraw treatments, Polymer, vol. 44 pp. 4959-4967 (2003).
Carretero et al., Numerical Simulation of Taylor Cone-Jets and Colloid Thruster Plumes. 4th International Conference on Spacecraft Propulsion, Cagliari, Italy. Jun. 2-4, 2004.
Chiu et al., Mass Spectrometric Analysis of Colloid Thruster Ion Emission from Selected Propellants. Journal of Propulsion and Power. 2005. 21(3):416-23.
Clampitt et al., Intense Field-Emission Ion Source of Liquid Metals. J of Vacuum Science and Technology. 1975. 12 (1):1208.
Cleaver et al., A 100-kV Ion Probe Microfabrication System with a Tetrode Gun. Vacuum Sci and Technol. 1981. 19(4): 1145-8.
Despois et al., Permeability of Open-Pore Microcellular Materials. Acta Materialia. Elsevier, Oxford, GB. Mar. 2005. 53(5): 1381-8.
Driesel et al., In Situ Observation of the Tip Shape of AuGe Liquid Alloy Ion Sources Using a High Voltage Transmission Electron Microscope. J. Vac. Sci. Technol. B. 1996. 14(5):3367-80.
Escher et al. Vacuum Ion Emission From Solid Electrolytes: An Alternative Source for Focused Ion Beams. Applied Physics Letters. 2006. 89: 053513-1 and 053513-2.
Guharay et al., Characteristics of Focused Beam Spots Using Negative Ion Beams From a Compact Surface Plasma Source and Merits for New Applications. Journal of Vacuum Science and Technology B. 1998. 16(6): 3370-3.

(56) References Cited

OTHER PUBLICATIONS

Guzdar et al., Charging of substrates irradiated by particle beams. Applied Physics Letters. 1997. 71(22). 3302-4.

He et al., Magnetic and photomagnetic properties of polycrystalline wide-gap semiconductor $Cd_{1-x}Mn_xTe$ thin films. Journal of Electronic Materials. Feb. 1997. 26(2):73-7.

Larriba et al., Monoenergetic Source of Kilodalton Ions from Taylor Cones of Ionic Liquids. Journal of Applied Physics. 2007. 101: 084303-1 to 084303-6.

Legge et al., 18.086 Final Project: Finite Element Modelling of Ionic Liquid Flow Through Porous Electrospray Emitters. May 14, 2008.

Legge et al., Fabrication and Characterization of Porous Metal Emitters for Electrospray Thrusters. IEPC-2007-145 Proc. 30th International Electric Propulsion Conference, Florence, Italy, Sep. 17-20, 2007.

Legge, Fabrication and Characterization of Porous Metal Emitters for Electrospray Applications. Massachusetts Institute of Technology: Department of Aeronautics and Astronautics. May 18, 2008. 140 pages.

Li et al. The Focused-Ion-Beam Microscope—More than a Precision Ion Milling Machine. JOM. 2006. 58 (3): 27-31.

Lozano et al., Electrospray Emission from Nonwetting Flat Dielectric Surfaces. Journal of Colloid and Interface Science. 2004. 276(2): 392-9.

Lozano et al., Energy Properties of an EMI-Im Ionic Liquid Ion Source. J Phys., D: Appl Phys. 2006. 39: 126-34.

Lozano et al., Experimental Measurements of Colloid Thruster Plumes in the Ion-Droplet Mixed Regime. (AIAA-3814) 38th Joint Propulsion Conference. Indianapolis, Indiana. Jul. 7-10, 2002. 1-6.

Lozano et al., Ionic liquid ion sources: Suppression of Electrochemical Reactions Using Voltage Alternation. J. Colloid Interf. Sci. 2004. vol. 280, pp. 149-154.

Lozano et al., On the Dynamic Response of Externally Wetted Ionic Liquid Ion Sources. J. Phys. D.: Appl Phys. 2005. 38(14).2371-7.

Lozano et al., Performance Characteristics of a Linear Ionic Liquid Electrospray Thruster. IEPC-2005-192. 29th International Electric Propulsion Conference. Princeton University (USA). Oct. 21-Nov. 2005.

McEwen et al., Electrochemical Properties of Imidazolium Salt Electrolytes for Electrochemical Capacitor Applications. J. Electrochem Soc. 1999. 146(5): 1687-95.

Muhle et al., A Time-of-Flight Spectrometer for Investigations on Liquid Metal Ion Sources. J. Phys. D: Appl Physics, 1999. 32(2): 161-7.

Prewett et al., Focused Ion Beams from Liquid Metal Ion Sources. Research Studies Press. 1991. 19-30, 78-101 and 151-74.

Scipioni et al., Performance of Multicusp Plasma Ion Source for Focused Ion Beam Applications. Journal of Vacuum Science and Technology B. 2000. 18(6). 3194-7.

Smith et al. High Brightness Inductively Coupled Plasma Source for High Current Focused Ion Beam Applications. Journal of Vacuum Science and Technology B.2006. 24(6): 2902-6.

Suzuki et al., Contrast Differences Between Scanning Ion and Scanning Electron Microscope Images. Journal Vacuum Science and Technology A. 2004. 22(1): 49-52.

Swanson et al., Emission Characteristics of Gallium and Bismuth Liquid Metal Ion Sources. J. Vac. Sci. Technol. 1979. 16(6): 1864-9.

Szilagyi et al., Electron and Ion Optics, Plenum Press. 1988. 216-50 and 251-63.

Tseng et al., Recent Developments in Nanofabrication Using Focused Ion Beams. Small. 2005. 1(10):924-39.

Velásquez-García et al., Fabrication of large arrays of high-aspect-ratio single-crystal silicon columns with isolated vertically aligned multi-walled carbon nanotube tips. Nanotechnology. Oct. 8, 2008. 19(40): 405305. doi:10.1088/0957-4484/19/40/405305.

Velásquez-García et al., SLA 3-D Printed Arrays of Miniaturized, Internally Fed, Polymer Electrospray Emitters. J of Microelectromechanical Systems. Sep. 15, 2015. PP(99): 1 page. DOI: 10.1109/JMEMS.2015.2475696.

Yamashita et al., Characteristics of elastomeric nanofiber membranes produced by electrospinning, Journal of Textile Engineering, vol. 53, No. 4, (2007). 10 pages.

Yang et al., Research Progress in Preparation and Application of Gradient-Porous Metal. Apr. 2008. Powder Metallurgy Industry. 18(7).

Zeng et al., Influence of Property Gradient on the Behavior of Cellular Materials Subjecyed to Impact Loading. AIP Conference Proceedings. AIP USA. Feb. 15, 2008. vol. 18.

U.S. Appl. No. 14/892,847, filed Nov. 20, 2015, Velásquez-García et al.

U.S. Appl. No. 13/681,155, filed Nov. 19, 2012, Lozano et al.

U.S. Appl. No. 14/336,814, filed Jul. 21, 2014, Lozano et al.

U.S. Appl. No. 14/661,855, filed Mar. 18, 2015, Lozano et al.

U.S. Appl. No. 14/681,264, filed Apr. 8, 2015, Lozano et al.

Office Action mailed Sep. 3, 2015 for U.S. Appl. No. 13/918,759.

Notice of Allowance mailed Feb. 4, 2016 for U.S. Appl. No. 13/918,759.

Miscellaneous Office Communication mailed Apr. 28, 2016 for U.S. Appl. No. 13/918,759.

International Search Report and Written Opinion mailed Jun. 17, 2010 for PCT/US2009/042990.

International Preliminary Report on Patentability mailed Nov. 18, 2010 for Application No. PCT/US2009/042990.

International Search Report and Written Opinion mailed Mar. 21, 2014 for PCT/US2013/057067.

International Preliminary Report on Patentability mailed Mar. 12, 2015 for Application No. PCT/US2013/057067.

U.S. Appl. No. 15/145,650, filed May 3, 2016, Velásquez-García et al.

U.S. Appl. No. 15/272,574, filed Sep. 22, 2016, Lozano et al.

PCT/US2009/042990, Jun. 17, 2010, International Search Report and Written Opinion.

PCT/US2009/042990, Nov. 18, 2010, International Preliminary Report on Patentability.

PCT/US2013/057067, Mar. 21, 2014, International Search Report and Written Opinion..

PCT/US2013/057067, Mar. 12, 2015, International Preliminary Report on Patentability.

Bennett, Spinning a yarn, nano-style—more affordable fibres. Materials World Magazine. The Institute of Materials, Minerals and Mining. Jan. 7, 2013. 2 pages. <www.iom3.org/news/spinning-yarn-nano-style-affordable-fibres> Last accessed Jun. 5, 2013.

Hardesty, Making 'nanospinning' practical. MIT News Office. Nov. 20, 2012. 3 pages. <web.mit.edu/newsoffice/2012/making-nanospinning-practical-1120.html?tmpl=component&print=1> Last accessed May 31, 2013.

\* cited by examiner

ELECTROSPRAYING SYSTEMS AND ASSOCIATED METHODS

RELATED APPLICATIONS

This application claims priority under 35 U.S.C. §119(e) to U.S. Provisional Patent Application Ser. No. 61/827,905, filed May 28, 2013, and entitled "High-Throughput Manufacturing of Nanofibers Using Massive Arrays of Electrospinning Emitters" and U.S. Provisional Patent Application Ser. No. 61/827,893, filed May 28, 2013, and entitled "Bio-Inspired Electrospray Emitter Arrays for High-Throughput Ionization of Liquids," each of which applications is incorporated herein by reference in its entirety for all purposes.

GOVERNMENT SPONSORSHIP

This invention was made with government support under Contract No. W31P4Q-11-1-0007 awarded by the Army Contracting Command. The government has certain rights in the invention.

TECHNICAL FIELD

Electrospraying systems and associated methods are generally described.

BACKGROUND

Electrospraying refers to methods in which a voltage is applied to a liquid (e.g., an ionic liquid or other suitable liquid) to produce ions and/or small droplets of charged liquid. In many electrospraying systems, the liquid is fed to a tip of a protrusion (e.g., a needle). Application of a sufficiently high voltage results in electrostatic repulsion within components of the liquid. The electrostatic repulsion counteracts the surface tension of the liquid, and a stream of liquid erupts from the surface. In many electrospraying systems, when the liquid is fed to the tip of the protrusion and the voltage is applied, varicose waves on the surface of the resulting liquid jet lead to the formation of small and highly charged liquid droplets, which are radially dispersed due to Coulomb repulsion.

While electrospraying is known in the art, most electrospraying systems include a single protrusion, for example, in the form of a single needle. Electrospraying systems that include multiple protrusions are generally not able to discharge liquid from the protrusions in a uniform fashion. Increasing the throughput of such systems while avoiding degradation in performance has proven to be difficult. Increasing the throughput from a single protrusion has resulted in modest improvement, but has generally been accompanied by deterioration of the spread in the properties of the emitted liquid (e.g., size, shape, and the like). Increasing throughput by utilizing large arrays with high protrusion density has proven to be challenging.

SUMMARY

Electrospraying systems and associated methods are generally described. The subject matter of the present invention involves, in some cases, interrelated products, alternative solutions to a particular problem, and/or a plurality of different uses of one or more systems and/or articles.

Certain embodiments relate to emitters configured for use in an electrospraying device. In some embodiments, the emitter comprises an array of protrusions extending from an emitter substrate, at least a portion of the protrusions in the array comprising a plurality of elongated nanostructures extending from external surfaces of the protrusions.

In some embodiments, the emitter comprises an array of protrusions extending from an emitter substrate, at least a portion of the protrusions in the array comprising a plurality of ordered nanostructures extending from external surfaces of the protrusions.

In certain embodiments, the emitter comprises an array of protrusions extending from an emitter substrate, at least a portion of the protrusions in the array comprising a plurality of nanostructures extending from an ordered intermediate material between the nanostructures and external surfaces of the protrusions.

Systems and methods comprising the emitters described herein are also provided.

Certain embodiments relate to a method of making an emitter configured for use in an electrospraying device. In some embodiments, the method comprises etching a fabrication substrate to produce a plurality of protrusions extending from the fabrication substrate; and depositing a plurality of nanostructures on external surfaces of the protrusions.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
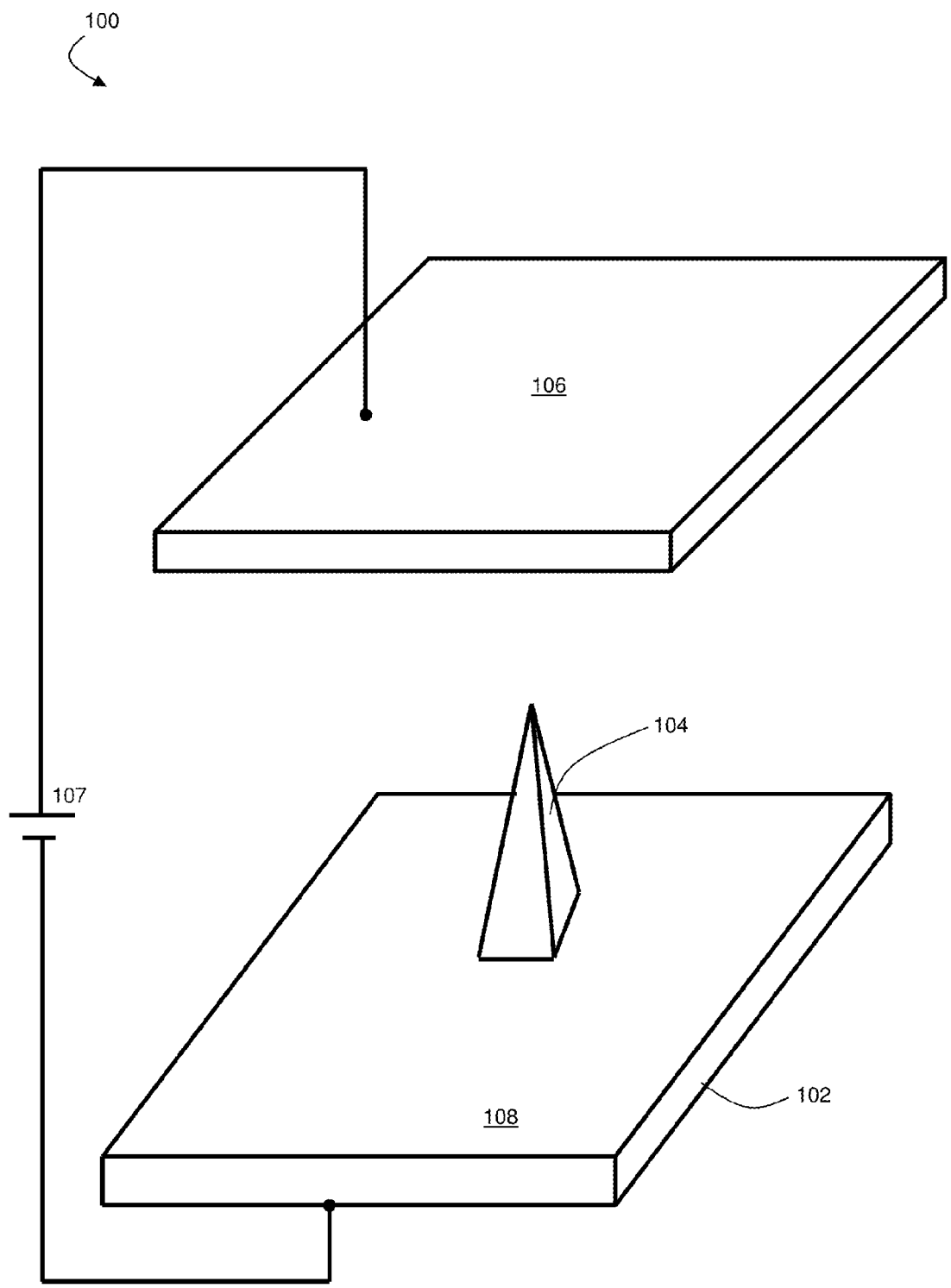
FIG. 1A is an exemplary schematic illustration of a system used to perform electrospraying comprising a single emitter protrusion.

Electrospraying systems and associated methods are generally described. Certain embodiments relate to the discovery that nanostructural features can be arranged on emitter protrusions to achieve desired performance in electrospraying systems. In certain embodiments, nanostructural features are arranged in an ordered fashion such that the flow of fluid to the tips of protrusions occurs at a consistent (and, in certain cases, controlled) rate. Transporting fluid to the tips of the protrusions at a consistent rate can allow one to, for example, produce a consistent discharge of fluid from a plurality of protrusions within an array while maintaining consistent (and, in certain instances, controllable) properties of the emitted fluid (e.g., size, shape, and the like). This can allow one to scale up electrospraying systems in which fluid is emitted from the tips of protrusions (e.g., by employing multiple emitter protrusions) such that the throughput of fluid through the system is increased while maintaining the ability to produce discharged fluid (e.g., in the form of threads, droplets, ions, and the like) with uniform properties.

According to certain embodiments, the systems and methods described herein can allow one to produce discharged fluid droplets and/or ions with consistent, relatively small dimensions simultaneously from multiple protrusions within an array. In certain such embodiments, discharged droplets and/or ions with relatively small dimensions can be produced while operating the electrospraying system at a relatively low voltage. Without wishing to be bound by any particular theory of operation, the ability to produce discharged fluid having small features at relatively small applied voltages might be explained as follows. In many protrusion-based electrospraying systems, discharge of fluid from the tips of the protrusions is achieved after a threshold voltage is applied across the emitter comprising the protrusions and a counter electrode (also sometimes referred to herein as the "extractor electrode"). It is believed that the application of a voltage above the threshold voltage triggers instability in the fluid at the protrusion tips, producing fluid discharge (e.g., in the form of droplets and/or ions of the fluid). It is believed that the use of protrusions with smaller tips can allow one to operate at smaller applied voltage. It is also believed that the dimensions of the discharged fluid depend on flow rate (rather than applied voltage), and that slower flow rates generally tend to produce smaller emitted fluid dimensions. Accordingly, restriction of the flow rate to the protrusion tip can allow for the emission of fluid having small features while also allowing for relatively low voltage operation. In some embodiments, the dimensions and layout of the nanostructures can be used to control (e.g., restrict) the flow of fluid to the tips of the protrusions in an emitter, which can be useful in producing droplets with relatively small cross-sectional dimensions. In certain such embodiments, the dimensions and/or arrangement of the nanostructures can be selected to produce a desired flow rate to the tips of the protrusions upon the application of a voltage, thereby allowing for the control, in certain instances, of the dimensions of the discharged fluid. In certain such embodiments, the dimensions of the protrusions can also be controlled to allow for low voltage operation, for example, at voltages very close to the fluid instability threshold voltage.

Certain embodiments relate to inventive fabrication techniques that can be used to produce emitters and extractor electrodes for use in electrospraying systems with advantageous properties. For example, certain of the fabrication techniques described herein can allow for the production of emitters comprising an array of protrusions with elongated nanostructures (such as, for example, nanotubes) in contact with the protrusions. Certain systems and methods involve the fabrication and/or use of emitters comprising an array of protrusions with nanostructures arranged on the external surfaces of the protrusions in an ordered fashion. Such ordered nanostructures can be formed on the protrusions, in some embodiments, without substantially affecting the consistency of the sizes and/or shapes of the protrusions themselves.

FIG. 1A is an exemplary schematic illustration of a conventional electrospraying system 100. Electrospraying system 100 comprises an emitter 102 comprising a protrusion 104 and an electrode 106. When a voltage is applied across emitter 102 and electrode 106 (e.g., via voltage source 107), fluid fed to protrusion 104 is discharged from the protrusion 104 in the direction of electrode 106. Many conventional electrospraying systems, such as system 100, include a single protrusion from which fluid is emitted. The amount of fluid flux in such systems is generally limited, due to the presence of only a single protrusion.

Figure 1B:
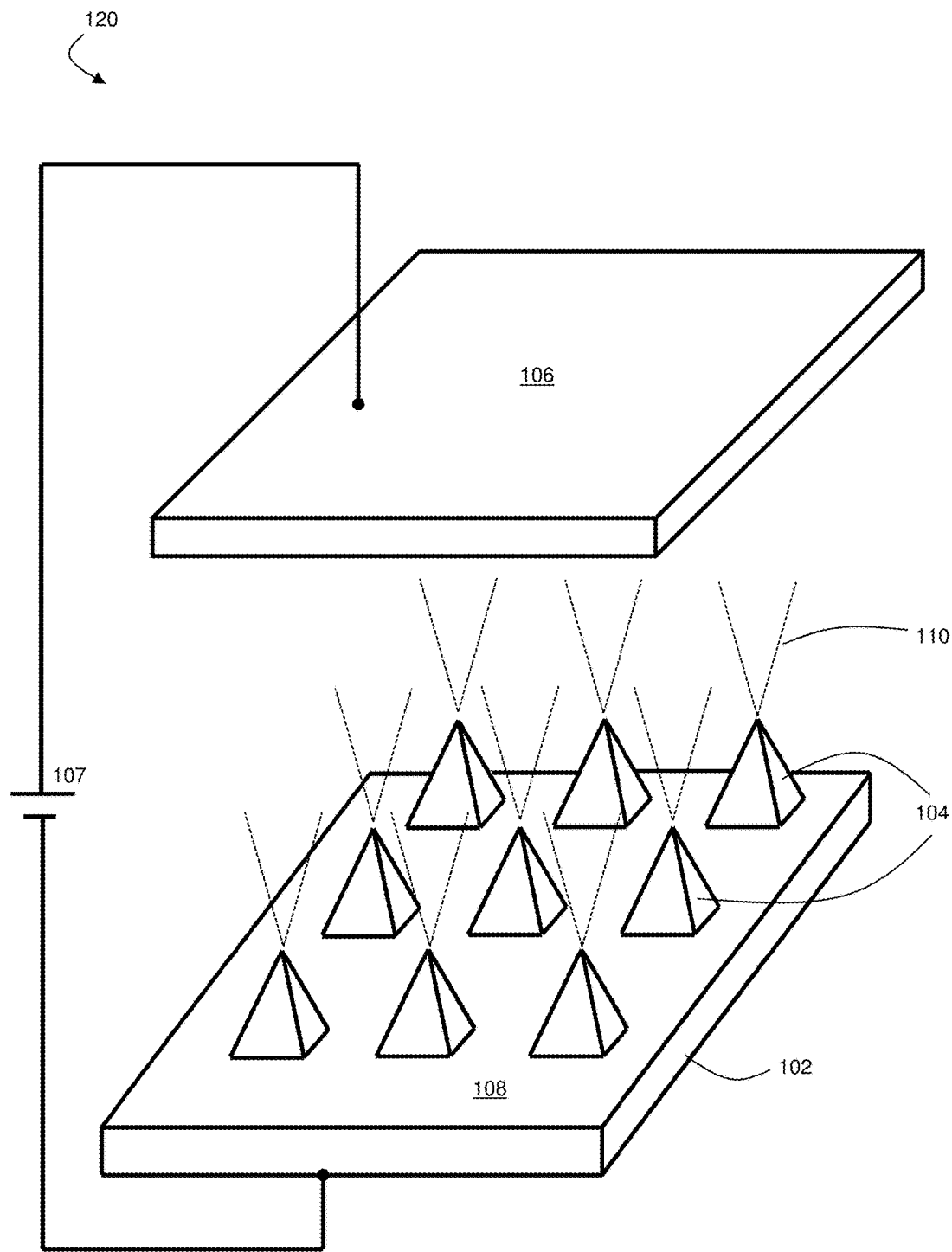
FIG. 1B is an exemplary schematic illustration of a system used to perform electrospraying comprising an array of emitter protrusions.

One way to increase the amount of fluid that is discharged in an electrospraying system is to include multiple protrusions from which liquid is emitted. This can allow, in certain embodiments, efficient emission through each protrusion while increasing the throughput by virtue of having a plurality of protrusions operating in parallel. Accordingly, in some embodiments, the electrospraying systems comprise an emitter and an electrode, where the emitter comprises a plurality of protrusions. For example, as illustrated in FIG. 1B, emitter 102 comprises a plurality of protrusions 104. The protrusions can be arranged such that they extend from an emitter substrate. For example, in FIG. 1B, protrusions 104 extend from emitter substrate 108.

In some embodiments, the emitter may be exposed to a fluid (e.g., an ionic liquid or any other suitable liquid) and a voltage may be applied across the emitter and electrode. Applying the voltage across the emitter and the electrode may result in the emission of fluid from the tips of at least a portion of the protrusions of the emitter toward the electrode. The fluid that is emitted from the emitter may comprise, for example, ions, solvated ions, and/or droplets. Referring to FIG. 1B, for example, system 120 may comprise electrode 106 (which is sometimes referred to herein as an extractor electrode) and voltage source 107. In certain embodiments, when emitter 102 is exposed to a fluid, and voltage is applied across emitter 102 and electrode 106, fluid 110 may be emitted from the tips of protrusions 104 toward electrode 106.

Figure 2A:
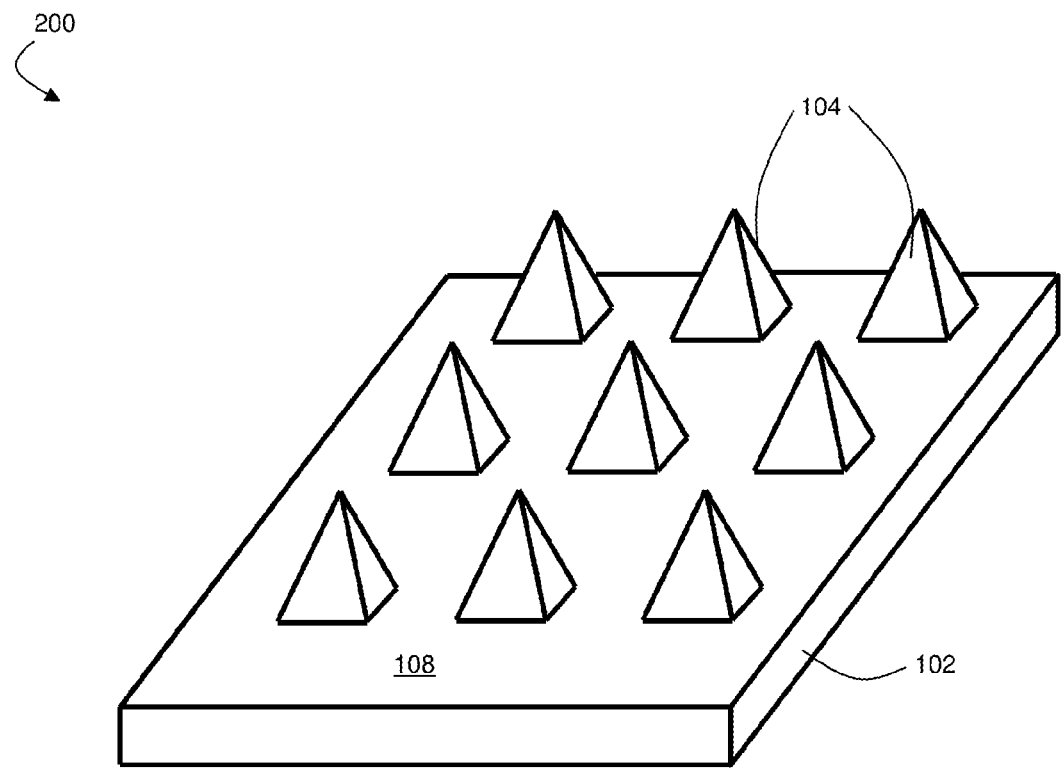
FIG. 2A is, according to some embodiments, a perspective view schematic diagram of an emitter substrate comprising an array of protrusions.
Figure 2B:
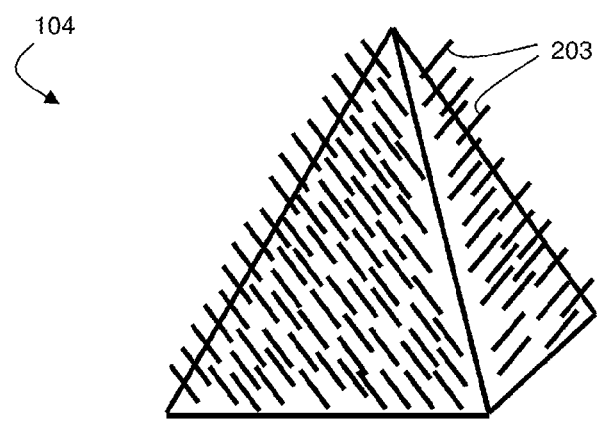
FIG. 2B is a perspective view schematic illustration of a protrusion within an emitter substrate, comprising a plurality of nanostructures, according to certain embodiments.

In certain embodiments, at least a portion of the protrusions in the array comprises a plurality of nanostructures extending from external surfaces of the protrusions. For example, FIG. 2A is an exemplary schematic illustration of emitter 102 comprising emitter substrate 108 and protrusions 104 extending from emitter substrate 108. The protrusions illustrated in FIG. 2A are arranged in a 3 by 3 array. However, arrays containing more or fewer protrusions are also possible, as described in more detail below. FIG. 2B is an exemplary schematic illustration of a protrusion 104 of emitter 102 in FIG. 2A. As illustrated in FIG. 2B, nanostructures 203 extend from the external surfaces of protrusions 104. In some embodiments, one or more (or all) protrusions may contain a relatively large number of nanostructures. For example, a protrusion may contain at least about 100, at least about 1,000, at least about 10,000, or at least about 100,000, or more nanostructures.

The presence of a plurality of nanostructures on external surfaces of at least a portion of the protrusions of an emitter array may result in enhanced properties, in certain embodiments. The nanostructures may, in some embodiments, be configured to transport fluid from the bases of the protrusions to the tips of the protrusions, where the electric field is generally the strongest, via capillary forces. Without wishing to be bound to a particular theory, the nanostructures may be advantageous because they provide a wetting structure on which fluid can spread. Additionally, the nanostructures may be advantageous because they provide hydraulic impedance to the fluid flow along the protrusion surface, allowing the flow rate fed to each protrusion to be controlled. The flow rate fed to a protrusion may determine whether the fluid emitted from the protrusion comprises ions, solvated ions, and/or droplets, as well as the size and shape of the emitted ions, solvated ions, and/or droplets. In some embodiments, the advantages provided by the nanostructures on the surface of the protrusions may allow high emitter current to be achieved at low voltages, while maintaining good array emission uniformity.

In certain embodiments, the nanostructures on the exterior surfaces of the emitter protrusions can be arranged in an ordered fashion. The ability to arrange the nanostructures in an ordered fashion can be important, in certain embodiments, because it can allow one to control the degree of hydraulic impedance provided by the nanostructures which, as mentioned above, can allow one to control the flow rate of the fluid provided to the tips of the emitter protrusions and allow for consistent performance of the electro spraying device.

In some embodiments, a plurality of nanostructures may extend from an ordered intermediate material between the nanostructures and the external surfaces of the protrusions. A variety of materials may be used for the intermediate material. In some cases, the intermediate material may comprise a catalyst used to form the nanostructures. Suitable catalysts include, for example, metal-based catalysts. Non-limiting examples of suitable metals include iron, gold, nickel, cobalt, tungsten, and/or aluminum. The intermediate material is not limited to catalyst materials, however, and other materials could be used. For example, the intermediate material could correspond to a material that non-catalytically enhances the formation of nanostructures over the intermediate material, relative to the substrate on which the intermediate material is formed. For example, the intermediate material may comprise silicon oxide formed over a silicon substrate, and nanostructures (e.g., carbon nanotubes) may be preferentially formed on the silicon oxide rather than the exposed silicon substrate. Other types of intermediate materials may also be used.

In some such embodiments, the intermediate material may be patterned or otherwise ordered such that nanostructures are formed only over the portions of the exterior surface of the protrusions over which the intermediate material is present. The ordering of the intermediate material may result in the formation of nanostructures positioned over the protrusions in an ordered manner.

As used herein, the term "ordered" means not random. Materials (e.g., nanostructures and/or intermediate materials positioned between nanostructures and protrusions) may be ordered, for example, by forming the materials into a predetermined pattern and/or by allowing the material to transform such that is ordered, such as via self-assembly methods.

In certain embodiments, the ordered material may be patterned over a protrusion, for example, by depositing a layer of the material over a protrusion and subsequently removing the material from at least one portion of the protrusion. As one example, in certain embodiments, the intermediate material may be formed over the protrusions and subsequently selectively removed from at least one portion of the external surfaces of the protrusions (e.g., using an etchant and a mask) such that the intermediate material is present only over desired portions of the protrusions. As another example, nanostructures may be formed (e.g., deposited, grown, or otherwise formed) over the protrusions (e.g., over an intermediate material, such as a catalyst, positioned over the protrusions) and subsequently selectively removed from at least a portion of the external surfaces of the protrusions (e.g., using an etchant and a mask) such that the nanostructures are present only over desired portions of the protrusions.

In some embodiments, the ordered material may be patterned over protrusions by selectively forming the ordered material over specific portions of the exposed surfaces of the protrusions. As one specific example, nanostructures may be patterned over protrusions by forming a catalyst only over certain portions of the external surfaces of the protrusions and subsequently growing the catalytically growing the nanostructures such that the nanostructures are formed only over the portions of the external surfaces of the protrusions over which the catalyst is positioned.

In some embodiments, the nanostructures may be positioned such that the spacing between the nanostructures can be somewhat regular. For example, in certain embodiments, the nanostructures can each have a nearest neighbor distance, and the standard deviation of the nearest neighbor distances may be less than about 100%, less than about 50%, less than about 20%, or less than about 10% of the average of the nearest neighbor distances. As used herein, the term "nearest neighbor distance" is understood to be the distance from the center of a structure to the center of the structure's nearest neighbor. In some embodiments, the nanostructures may be arranged as a periodically repeating array of nanostructures.

The standard deviation (lower-case sigma) of a plurality of values is given its normal meaning in the art, and can be calculated as:

$$\sigma = \sqrt{\frac{\sum_{i=1}^{n}(V_i - V_{avg})^2}{n-1}} \quad [1]$$

wherein $V_i$ is the $i^{th}$ value among n total values, $V_{avg}$ is the average of the values, and n is the total number of values. The percentage comparisons between the standard deviation and the average of a plurality of values can be obtained by dividing the standard deviation by the average and multiplying by 100%. As an illustrative example, to calculate the percentage standard deviation of a plurality of nearest neighbor distances for 10 nanostructures, one would calculate the nearest neighbor distance for each nanostructures ($V_1$ through $V_{10}$), calculate $V_{avg}$ as the number average of the nearest neighbor distances, calculate a using these values and Equation 1 (setting n=10), dividing the result by $V_{avg}$, and multiplying by 100%.

In certain embodiments, the intermediate material may be arranged as a plurality of islands of the intermediate material. In some such cases, each of the islands of intermediate material may have a nearest neighbor distance, and the standard deviation of the nearest neighbor distances may be less than about 100%, less than about 50%, less than about 20%, or less than about 10% of the average of the nearest neighbor distances. In some embodiments, the plurality of islands of intermediate material may be arranged as a periodically repeating array of islands of intermediate material.

A variety of nanostructures can be used in association with certain of the embodiments described herein. As used herein, the term "nanostructure" refers to any structure having at least one cross-sectional dimension, as measured between two opposed boundaries of the nanostructure, of less than about 1 micron. In certain embodiments, the nanostructures can be elongated nanostructures. For example, in some embodiments, the nanostructures can have aspect ratios greater than about 10, greater than about 100, greater than about 1,000, or greater than about 10,000 (and/or up to 100,000:1, up to 1,000,000:1, or greater).

In some embodiments, at least a portion of the nanostructures may comprise nanotubes (e.g., single-walled nanotubes, multi-walled nanotubes), nanofibers, nanowires, nanopillars, nanowhiskers, and the like. As used herein, the term "nanotube" is given its ordinary meaning in the art and refers to a substantially cylindrical nanostructure containing a different material in its interior than on its exterior. In certain embodiments, the nanotubes can be hollow. In some embodiments, the nanotube can be formed of a single molecule. In some embodiments, the nanotubes comprise a fused network of primarily six-membered atomic rings. It should be understood that the nanotube may also comprise rings or lattice structures other than six-membered rings. In some embodiments, the nanotubes may be metallic, semiconducting, or insulating. In some embodiments, at least a portion of the nanostructures are carbon nanotubes (e.g., single-walled carbon nanotubes and/or multi-walled carbon nanotubes). In some embodiments, at least a portion of the nanostructures are non-carbon nanotubes. In some embodiments, at least a portion of the nanostructures are inorganic nanotubes. The non-carbon nanotube material may be selected from polymer, ceramic, metal and other suitable materials. For example, the non-carbon nanotube may comprise a metal such as Co, Fe, Ni, Mo, Cu, Au, Ag, Pt, Pd, Al, Zn, or alloys of these metals, among others. In some instances, the non-carbon nanotube may be formed of a semi-conductor such as, for example, Si. In some cases, the non-carbon nanotubes may be Group II-VI nanotubes, wherein Group II elements are selected from Zn, Cd, and Hg, and Group VI elements are selected from O, S, Se, Te, and Po. In some embodiments, non-carbon nanotubes may comprise Group III-V nanotubes, wherein Group III elements are selected from B, Al, Ga, In, and Tl, and Group V elements are selected from N, P, As, Sb, and Bi. As a specific example, the non-carbon nanotubes may comprise boron-nitride nanotubes.

In some embodiments, at least a portion of the nanostructures are carbon-based nanostructures. As used herein, a "carbon-based nanostructure" comprises a fused network of aromatic rings wherein the nanostructure comprises primarily carbon atoms. In some embodiments, the carbon-based nanostructure comprises at least about 75 wt % carbon, at least about 90 wt % carbon, or at least about 99 wt % carbon. In some instances, the nanostructures have a cylindrical, pseudo-cylindrical, or horn shape. A carbon-based nanostructure can comprises a fused network of at least about 10, at least about 50, at least about 100, at least about 1,000, at least about 10,000, or, in some cases, at least about 100,000 aromatic rings.

In certain cases, at least some of the nanostructures may have a length of at least about 10 nm, at least about 100 nm, at least about 1 micrometer, or at least about 10 micrometers (and/or, in certain embodiments, up to about 50 microns, up to about 100 microns, up to about 1 millimeter, or greater). In some embodiments, at least some of the nanostructures can be substantially cylindrical and can have a diameter of less than about 1 micron, less than about 500 nm, less than about 200 nm, less than about 100 nm, less than about 50 nm, or less than about 10 nm (and/or, in certain embodiments, as little as 1 nm, or less).

The nanostructures may be formed from any suitable material. In some embodiments, at least a portion of the nanostructures may comprise carbon. In certain embodiments, at least a portion of the nanostructures comprise silicon. The nanostructures may comprise, in certain embodiments, both silicon and carbon (e.g., in the form of silicon carbide).

In some cases, a layer of material may be positioned over the nanostructures. For example, in some embodiments, a coating (e.g., a substantially conformal coating) may be positioned over the nanostructures. The coating can be used, in certain embodiments, the alter the wetting properties of the exposed surface of the nanostructures, which can be helpful in ensuring that the fluid that is to be discharged from the electrospraying emitter is substantially evenly-coated over the electrode. Non-limiting examples of suitable materials for use in layers positioned over the nanostructures (e.g., coatings) include metals (e.g., gold, platinum, tungsten, and the like), dielectric materials, and/or polymeric materials. In certain embodiments, the layer positioned over the nanostructures comprises at least one self-assembled monolayer.

Nanostructures may be deposited on the protrusions of an emitter using any of a variety of methods. In certain embodiments, depositing a plurality of nanostructures on an external surface of a protrusion involves an additive process in which new material is added to the protrusion (in contrast to methods by which nanostructures are formed on a protrusion by reacting a portion of the protrusion on or near the exposed surface of the protrusion). In some embodiments, depositing a plurality of nanostructures on an external surface of a protrusion comprises performing a chemical reaction to form a plurality of nanostructures on a substrate. For example, in some cases, nanostructures may be deposited on an external surface of a protrusion via chemical vapor deposition (CVD). In some such embodiments, nanostructures may be deposited on an external surface of a protrusion using plasma-enhanced chemical vapor deposition (PECVD). The use of CVD processes (including PECVD process) may, in certain cases, ensure that the nanostructures conformally coat the protrusions and/or that the nanostructures are firmly attached to the surfaces of the protrusions. In some embodiments, precursor gases for use in the PECVD technique may include, but are not limited to, ammonia, methane, hydrogen, and/or acetylene.

In some embodiments, depositing a plurality of nanostructures on an external surface of a protrusion comprises non-reactively accumulating material on the surface of a protrusion. For example, precursor material could be, in some embodiments, precipitated from a solution onto one or more protrusions to form nanostructures.

In some embodiments, the nanostructures positioned over the protrusions may be exposed to further surface treatment. The surface treatment may be used, for example, to modify the wetting properties of the nanostructures, which can be useful in ensuring that the liquid that is to be discharged from the protrusions is substantially evenly distributed across the external surfaces of the protrusions. In some embodiments, at least a portion of the protrusions may be exposed to plasma, such as an oxygen plasma. For example, in some embodiments, the nanostructures are exposed to a short, low-power $O_2$ plasma treatment. Such treatment may enhance the wetting characteristics of the nanostructures.

In some embodiments in which elongated nanostructures are employed, the nanostructures may be arranged such that the long axes of the nanostructures are substantially aligned relative to each other. The term "long axis" is used to refer to the imaginary line drawn parallel to the longest length of the nanostructure and intersecting the geometric center of the nanostructure. In some cases, the nanostructures may be fabricated by uniformly growing the nanostructures on the surface of a protrusion, such that the long axes are aligned and non-parallel to the protrusion surface (e.g., substantially perpendicular to the protrusion surface). In some cases, the long axes of the nanostructures are oriented in a substantially perpendicular direction with respect to the surface of a protrusion, forming a nanostructure "forest." It should be understood that the use of aligned nanostructures is not necessary, and in some embodiments, at least a portion of the nanostructures may not be substantially aligned.

Generally the hydraulic impedance produced by a coating of nanostructures depends on the diameters of the nanostructures and their packing density. Thus, in some embodiments, the spacings and/or the dimensions of the nanostructures described herein may be tailored to achieve a flow rate needed for a desired fluid emission regime (e.g., a regime in which ions are emitted from the protrusions, a regime in which droplets are emitted from the protrusions, or a regime in which both droplets and ions are emitted from the protrusions). For example, emission in the ionic regime may be achieved with a low flow rate and high hydraulic impedance, while emission in the mixed ionic/droplet regime may be achieved with higher flow rate and lower hydraulic impedance. Hydraulic impedance may be increased by increasing the diameter of the nanostructures and the packing density of the nanostructures. Nanostructure diameter and packing density may be tuned by adjusting parameters of the growth process, including choice of catalyst material, anneal temperature, growth temperature, growth time, and choice of process gases. Those of ordinary skill in the art, given the present disclosure, would be capable of adjusting nanostructure growth conditions to produce nanostructures having suitable dimensions and packing densities for achieving a desired flow regime.

The emitters described herein can be formed of a variety of suitable materials. In some embodiments, the emitter substrate and the array of protrusions extending from the emitter substrate can be formed of the same material. In other embodiments, the emitter substrate and the array of protrusions are formed of different materials. In some embodiments, the emitter may be fabricated from an electrically conductive material. In other embodiments, the emitter may be fabricated from a material that is only slightly electronically conductive (or substantially not electronically conductive. In some such embodiments, transport of the electrosprayed fluid toward the extractor electrode can be achieved by applying an electrical voltage between the fluid and the extractor electrode.

In some embodiments, at least a portion of the emitter substrate and/or the protrusions may be formed of a semiconductor. Non-limiting examples of suitable semiconductor materials include silicon, germanium, silicon carbide, and/or III-V compounds (such as GaN, GaAs, GaP, and/or InP). In certain cases, at least a portion of the emitter substrate and/or the protrusions may comprise a dielectric material. The emitter could also be fabricated, in certain embodiments, from a metal.

In certain cases, the protrusions extending from the emitter substrate can be relatively small. The use of small protrusions can allow one to arrange a relatively large number of protrusions within a relatively small area, which can be useful in scaling up the electrospraying system. In some embodiments, at least a portion of (e.g., at least about 50% of, at least about 75% of, at least about 90% of, at least about 99% of, or substantially all of) the protrusions extending from the emitter substrate have maximum cross-sectional dimensions of less than about 1 millimeter. In some such embodiments, at least a portion of (e.g., at least about 50% of, at least about 75% of, at least about 90% of, at least about 99% of, or substantially all of) the protrusions extending from the emitter substrate have maximum cross-sectional dimensions of at least about 1 micron, at least about 10 microns, or at least about 50 microns. As used herein, the "maximum cross-sectional dimension" refers to the largest distance between two opposed boundaries of an individual structure that may be measured. In cases in which the protrusion is an integral part of the emitter substrate from which it extends, the lower boundary of the protrusion corresponds to a hypothetical extension of the external surface of the emitter substrate on which the protrusion is positioned. In some cases, at least a portion of the protrusions may have a height (measured relative to the external surface of the emitter substrate on which the protrusions are formed) of less than 5 mm, less than 1 mm, less than 500 microns, less than 400 microns, less than 300 microns, less than 200 microns, less than 100 microns, or less than 50 microns. In some embodiments, at least a portion of the protrusions are microstructures, having at least one cross-sectional dimension of less than about 1 mm, less than about 100 micrometers, or less than about 10 micrometers (and/or, in some embodiments, as little as 1 micrometer, or smaller).

In some embodiments, the protrusions may have tips with relatively sharp tips. The use of protrusions having sharp tips may, in certain embodiments, enhance the magnitude of the electric field near the protrusion tip, which can aid in creating instability in the fluid and, in turn, lead to discharge of the fluid from the protrusion tip. In some embodiments, at least a portion (e.g., at least about 50%, at least about 75%, at least about 90%, or at least about 99%) of the protrusions have a tip comprising a radius of curvature of less than about 5 microns, less than about 1 micron, less than about 500 nm, less than about 100 nm, less than about 50 nm, or less than about 10 nm.

In certain embodiments, the protrusions extending from the emitter substrate are arranged in an array. The array may, in some embodiments, comprise at least about 10 protrusions, at least about 20 protrusions, at least about 50 protrusions, at least about 100 protrusions, at least about 1,000 protrusions, at least about 1,900 protrusions (and/or, in certain embodiments, at least about 5,000 protrusions, at least about 10,000 protrusions, or more). The protrusions within the array may be arranged randomly or according to a pattern. In some embodiments, the protrusions within the array can be ordered in a substantially periodic pattern. In certain embodiments, the protrusions are arranged in an array such that the array extends in at least two orthogonal directions. Such arrays may be planar or non-planar (e.g., curved).

In some embodiments, a relatively large number of protrusions can be arranged within a relatively small area, which can be useful in scaling up the electrospraying system. In certain embodiments, the array includes at least about 10 protrusions/cm$^2$, at least about 100 protrusions/cm$^2$, at least about 1,000 protrusions/cm$^2$, at least about 1,900 protrusions/cm$^2$, or at least about 10,000 protrusions/cm$^2$ (and/or, in certain embodiments, up to about 100,000 protrusions/cm$^2$, or more).

In certain embodiments, at least a portion of (e.g., at least about 50% of, at least about 75% of, at least about 90% of, at least about 99% of, or substantially all of) the protrusions may be configured, in certain embodiments, such that a significant portion of (e.g., at least about 50% of, at least about 75% of, at least about 90% of, at least about 99% of, or substantially all of) the fluid expelled from the protrusions during operation of the system is externally surface directed from the protrusions toward the electrode. Generally, fluid is externally surface directed from a protrusion when the fluid travels along the external surface of the protrusion. Such protrusions can be said to be "externally fed." The use of externally fed protrusions can be advantageous, in some embodiments, because clogging of passageways within the protrusions—which might be observed in internally fed protrusions, such as nozzles—can be avoided. In some embodiments, the externally fed protrusions do not contain internal fluid passageways. Generally, external fluid passageways are those that are open to the external environment along their lengths, while internal passageways are isolated from the external environment along their lengths. In some embodiments, the externally fed protrusions are non-porous.

In some embodiments, the protrusions may be similar in size and shape. In some cases, the standard deviation of the maximum cross-sectional dimensions of the protrusions may be less than about 100%, less than about 50%, less than about 20%, less than about 10%, less than about 5%, or less than about 1% of the average maximum cross-sectional dimensions of the protrusions. In certain cases, the standard deviation of the volume of the protrusions may be less than about 100%, less than about 50%, less than about 20%, less than about 10%, less than about 5%, or less than about 1% of the average volume of the protrusions. One advantage of using protrusions that are similar in size and shape, in certain instances, is that flow can be more easily controlled, which can result in the formation of electrosprayed droplets that are more uniform in size and shape.

Certain embodiments relate to methods of using certain of the electrospraying systems described herein. In some embodiments, an electrospraying method comprises exposing an emitter to a fluid and applying voltage across the emitter and an electrode. Applying the voltage results, in some embodiments, in emission of fluid (e.g., in the form of droplets and/or ions) from at least a portion of the tips of the protrusions of the emitter toward the electrode.

Any suitable fluid can be used as the electrosprayed fluid. In some embodiments, the electrosprayed liquid comprises a charged fluid. In some embodiments, the fluid used in the electrospraying system may be polar. In some embodiments, the electrosprayed fluid comprises a liquid. In some embodiments, the electrosprayed liquid comprises an ionic liquid. Ionic liquids can be used as the electrosprayed liquid, for example, when the production of ions is desired. Non-limiting examples of ionic liquids suitable for use in the electrospraying systems described herein include 1-ethyl-3-methylimidazolium tetrafluoroborate (EMI-BF$_4$), 1-ethyl-3-methylimidazolium bis(trifluoromethylsulfonyl)imide (EMI-Im), 1-butyl-3-methylimidazolium tetrachloroferrate (bmim[FeCl$_4$]), and 1-butyronitrile-3-methylimidazolium tetrachloroferrate (nbmim[FeCl$_4$]). Other ionic liquids could also be used.

The fluid emitted from protrusions within the electrospraying system may comprise ions, solvated ions, and/or droplets. In some embodiments in which droplets are emitted from protrusions of the electrospraying system, the droplets may have relatively consistent maximum cross-sectional dimensions and/or volumes. For example, in some embodiments, the droplets emitted from the protrusions of the electrospraying system can each have maximum cross-sectional dimension, and the standard deviation of the maximum cross-sectional dimensions of the droplets may be less than about 100%, less than about 50%, less than about 20%, or less than about 10% of the average of the maximum cross-sectional dimensions of the droplets. In some embodiments, the droplets emitted from the protrusions of the electrospraying system can each have a volume, and the standard deviation of the volumes of the droplets may be less than about 100%, less than about 50%, less than about 20%, or less than about 10% of the average of the volumes of the droplets. In certain embodiments, droplets emitted from protrusions are monodisperse.

The electrospraying systems described herein can be operated at relatively low voltages, in certain embodiments. In some embodiments, the voltage applied to the electrospraying system may be less than about 100 kV, less than about 50 kV, less than about 10 kV, less than about 5 kV, less than about 2.5 kV, less than about 1 kV, less than about 500 V, less than about 100 V, or less than about 50 V (and/or, in some embodiments, as little as about 10 V, or less) while fluid discharge having any of the properties described herein is generated. In certain embodiments, during operation of the electrospraying system, the current per protrusion tip may be greater than about 1 microamp, greater than about 3 microamps, or greater than about 5 microamps (and/or, in certain embodiments, up to about 10 microamps, or more).

Figure 2C:
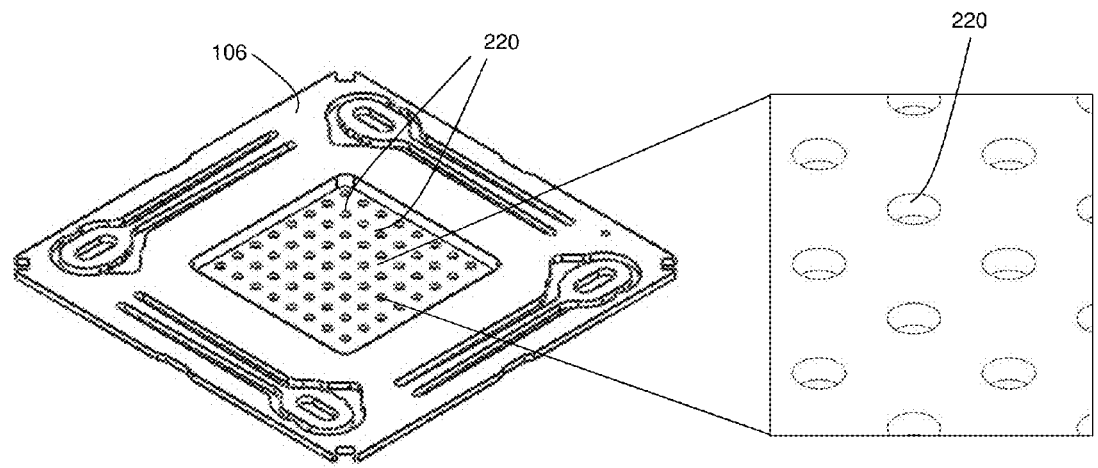
FIG. 2C is an exemplary schematic illustration of an extractor electrode comprising a plurality of apertures.

In some embodiments, extractor electrode die may contain an array of apertures. For example, FIG. 2C is a schematic illustration of an extractor electrode 106 comprising a plurality of apertures 220. The apertures may be, in certain embodiments, substantially circular, substantially rectangular (e.g., substantially square), or any other shape. As illustrated in FIG. 2C, apertures 220 are substantially circular in cross-section. In certain embodiments, the use of substantially circular apertures can be advantageous, although such aperture shapes are not required. In some embodiments, the apertures may have maximum cross-sectional dimensions of less than about 1 mm, less than about 500 microns, less than about 400 microns, less than about 200 microns, less than about 100 microns, less than about 50 microns, or less than about 10 microns in diameter.

Figure 2D:
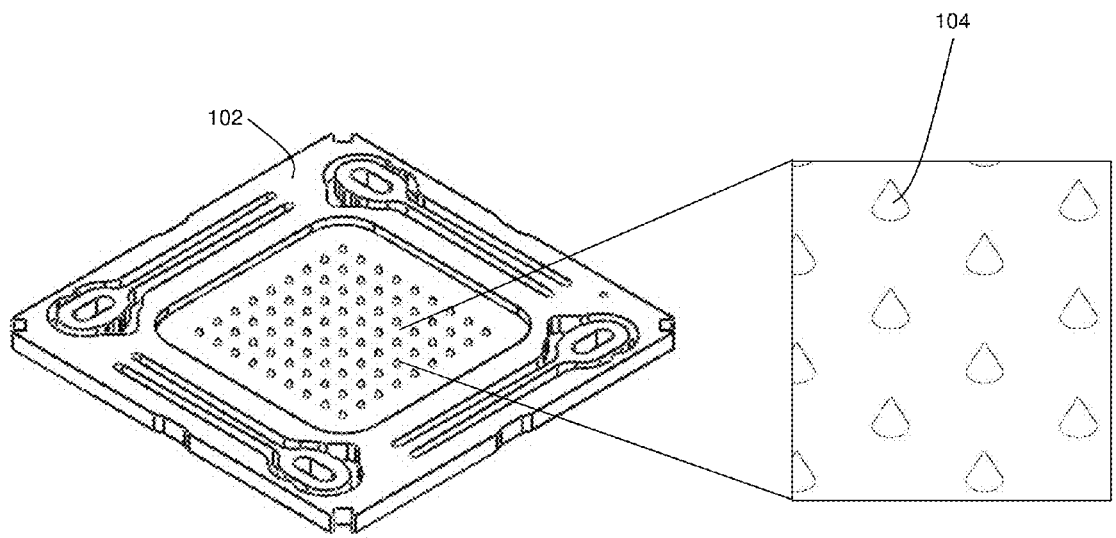
FIG. 2D is an exemplary schematic illustration of an emitter comprising a plurality of protrusions.
Figure 2E:
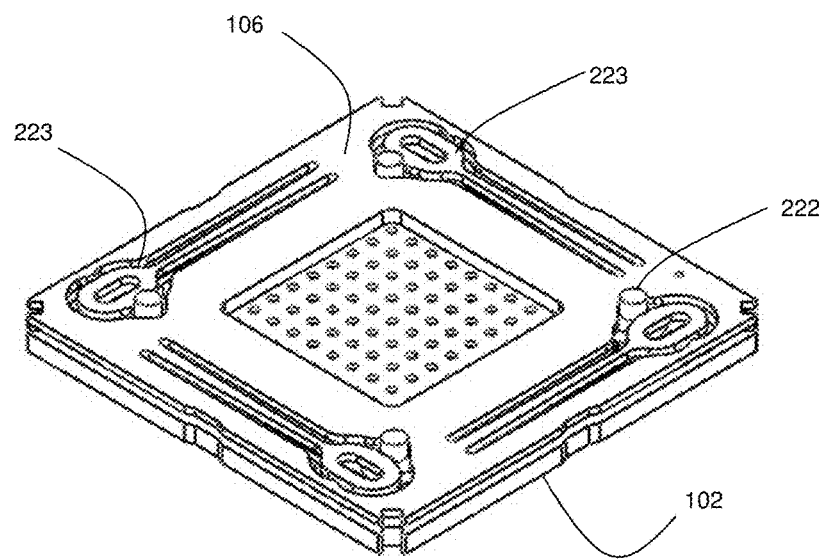
FIG. 2E is a perspective view schematic illustration of an electrospraying system in which an extractor electrode is positioned over an emitter.
Figure 2F:
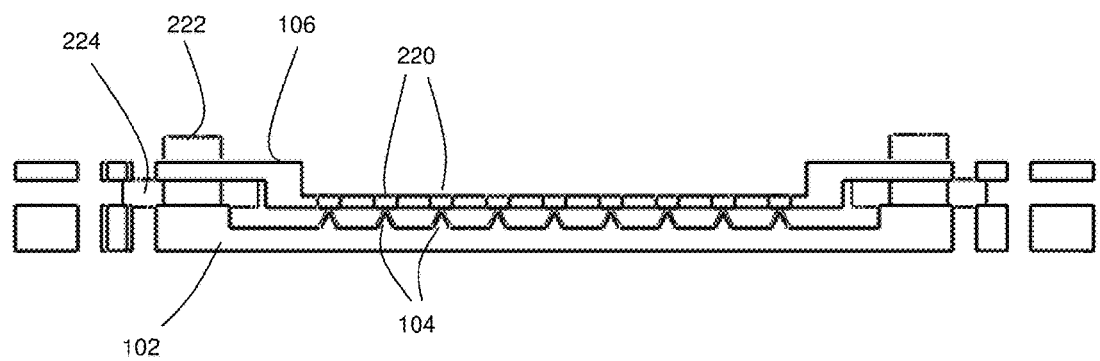
FIG. 2F is a cross-sectional schematic illustration of the electrospraying system shown in FIG. 2E, which comprises an extractor electrode positioned over an emitter.

The emitter and the extractor electrode can be arranged such that the extractor electrode is positioned over the emitter. For example, FIG. 2E is a perspective view illustration of an electrospraying system in which extractor electrode 106 illustrated in FIG. 2C is positioned over emitter 102 illustrated in FIG. 2D. FIG. 2F is a cross-sectional schematic illustration of the arrangement shown in FIG. 2E. In some embodiments, the apertures within the array can be spatially arranged such that their positions substantially correspond to the positions of the protrusions on the emitter. For example, referring to FIG. 2F, apertures 220 of extractor electrode 106 are positioned such that they overlie protrusions 104 of emitter 102. In some embodiments, the gap between the emitter and extractor electrode may be less than about 500 microns, less than about 100 microns, less than about 50 microns, or less than about 10 microns. The emitter and the extractor electrode may be held together, in certain embodiments, via a pin, dowel, or other connector. For example, in FIG. 2F, dowel 222 (e.g., a ceramic dowel) is inserted through openings in the emitter and the extractor electrode, which maintains the alignment of the electrodes. In certain embodiments, the emitter and/or the extractor electrode comprise deflection springs that clamp onto the connector (e.g., dowel) pins to enable precision alignment of the two components. For example, in FIG. 2E, extractor electrode 106 comprises deflection springs 223. In some embodiments, a spacer (e.g., a polyimide spacer) can also be included between the emitter and the extractor electrode, which can be used to maintain consistent spacing between the electrodes. For example, in FIG. 2F, spacer 224 is positioned between emitter 102 and extractor electrode 106. In some embodiments, when the two dies are assembled, each protrusion tip sits underneath an aperture.

Certain embodiments relate to methods of fabricating electrospraying systems and components for use therein. In some embodiments, a method of making an emitter is described. The method comprises, in some embodiments, etching a fabrication substrate to produce a plurality of protrusions extending from the fabrication substrate. In some such embodiments, the method further comprises depositing a plurality of nanostructures on external surfaces of the protrusions.

Figure 3A:
FIGS. 3A-3H are, according to one set of embodiments, cross-sectional schematic diagrams illustrating a process for fabricating an emitter substrate comprising a plurality of protrusions.

FIGS. 3A-3H are a series of cross-sectional schematic diagrams outlining an exemplary process for fabricating an emitter (e.g., for use in an electrospraying system). As shown in FIG. 3A, the process begins with fabrication substrate 301. Fabrication substrate 301 can correspond to, for example, any wafer suitable for use in a microfabrication process. For example, in some embodiments, fabrication substrate 301 corresponds to a silicon wafer.

Figure 3E:
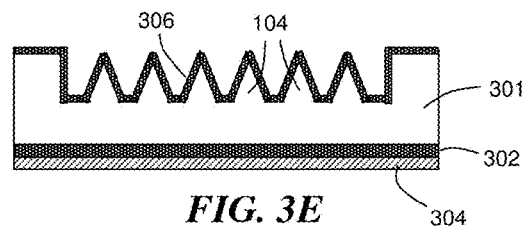
Figure 3B:
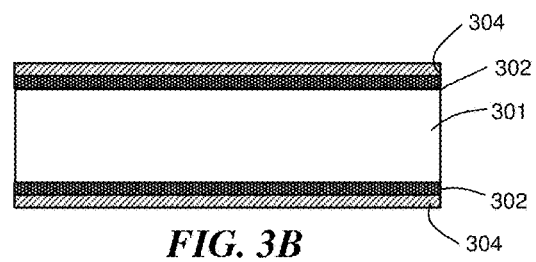
Figure 3F:
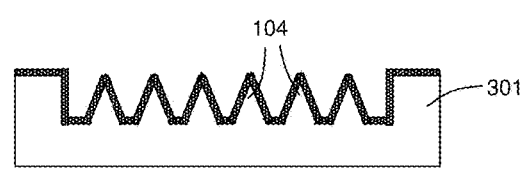
Figure 3C:
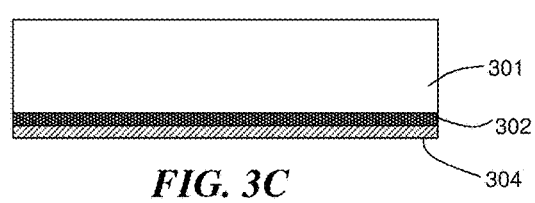
Figure 3G:
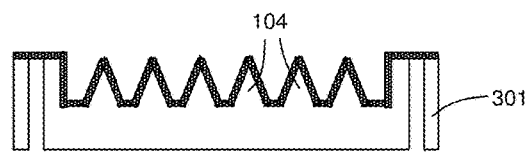
Figure 3D:
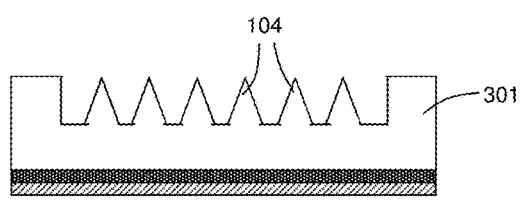
Figure 3H:
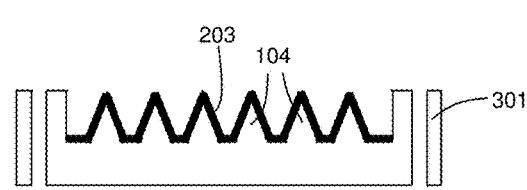

In some embodiments, fabrication substrate is etched to produce a plurality of protrusions (which can correspond to protrusions 104 in FIGS. 1B, 2A, 2B, 2D, and 2F) extending from the fabrication substrate. In some embodiments, etching the fabrication substrate comprises reactive ion etching (RIE). In certain cases, the reactive ion etching may comprise deep reactive ion etching (DRIE). Etching the fabrication substrate to produce the protrusions can be achieved, for example, using an etch mask. Referring to FIG. 3B, for example, etch masks 302 (e.g., a silicon oxide layer with, for example, a thickness of about 500 nm) can be formed on the front and back sides of fabrication substrate 301. In certain embodiments, additional masking materials (e.g., a silicon-rich silicon nitride layer 304 with a thickness of, for example, 250 nm) can be deposited. In some embodiments, deep reactive ion etching—using, for example, a photoresist mask (not illustrated)—is then used to create protrusions 104, as shown in FIG. 3D. In certain embodiments, and as illustrated in FIG. 3E, the protrusions on the front side of the fabrication substrate are oxidized, resulting in oxide layer 306. Optionally, and as shown in FIG. 3F, masking layers 302 and 304 can be removed from the back side of the fabrication substrate 301. In some embodiments, and as illustrated in FIG. 3G, additional features (e.g., alignment features) can be etched from the back side of the fabrication substrate (e.g., via deep reactive ion etching or any other suitable etching technique). Optionally, in some embodiments, oxide layer 306 is removed from the front side of the fabrication substrate.

As noted above, the method of making the emitter further comprises, in certain embodiments, depositing a plurality of nanostructures on external surfaces of the protrusions. For example, referring to FIG. 3H, nanostructures 203 can be deposited on the exposed surface of protrusions 104.

As noted elsewhere, deposition of the nanostructures can comprise performing a chemical reaction to form the nanostructures, precipitating a material to form the nanostructures, or otherwise adding material to the protrusions to form the nanostructures. In some embodiments, nanostructures are formed over the protrusions via catalytic growth. For example, the fabrication process may comprise depositing a catalyst over the fabrication substrate after etching the fabrication substrate to produce the plurality of protrusions and prior to depositing the plurality of nanostructures on the external surfaces of the protrusions. Subsequently, after the catalyst has been deposited, the nanostructures can be catalytically grown. As one specific example, in some embodiments, nanostructures 203 can correspond to carbon nanotubes, which can be catalytically grown after depositing a metal film (e.g., a Ni/TiN film) over protrusions 104.

In some embodiments, the process of forming the emitter may comprise removing at least a portion of the catalyst after depositing the catalyst over the fabrication substrate. In some such embodiments, the catalyst can be removed in order to form an ordered catalyst layer. The ordered catalyst layer can be used to produce nanostructures that are positioned over the protrusions in an ordered fashion, as described in more detail above. In some embodiments, removing at least a portion of the catalyst results in the formation of catalyst nanoparticles over the fabrication substrate. In other embodiments, substantially no portions of the catalyst are removed prior to deposition of the nanostructures, and order can be introduced to the nanostructures by removing at least a portion of the deposited nanostructures.

Figure 3I:
FIGS. 3I-3P are, according to one set of embodiments, cross-sectional schematic diagrams illustrating a process for fabricating an extractor electrode.
Figure 3M:
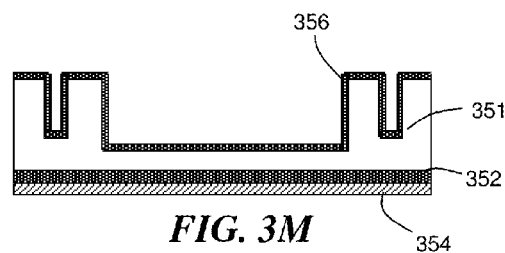
Figure 3J:
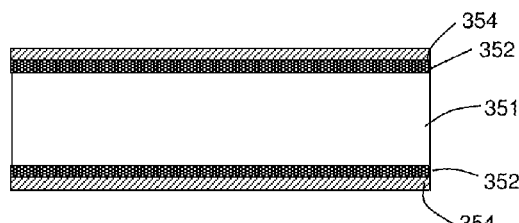
Figure 3N:
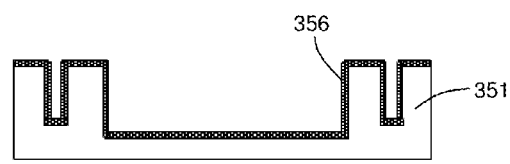
Figure 3K:
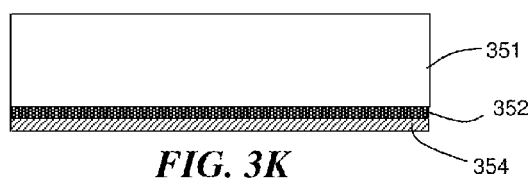
Figure 3O:
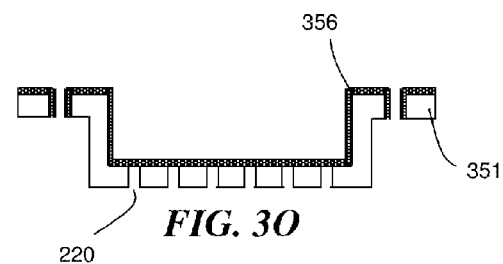
Figure 3L:
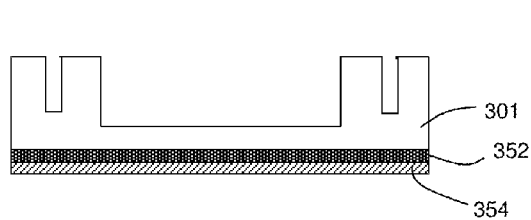
Figure 3P:
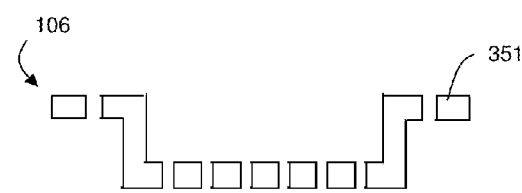

FIGS. 3I-3P are a series of cross-sectional schematic diagrams outlining an exemplary process for fabricating an extractor electrode, such as extractor electrode 106 illustrated in FIGS. 2C, 2E, and 2F. As shown in FIG. 3I, the exemplary process begins with substrate 351. Substrate 351 can correspond to, for example, any wafer suitable for use in a microfabrication process. For example, in some embodiments, substrate 351 corresponds to a silicon wafer. One or more masks can be formed on substrate 351. For example, in FIG. 3I, a silicon oxide mask 352 (e.g., with a thickness of about 500 nm) is positioned over both sides of substrate 351. In FIG. 3J, a silicon nitride mask 354 is positioned over the silicon oxide mask 352. Next, as illustrated in FIG. 3K, the front side oxide and nitride masks can be removed. Subsequently, an etching step (e.g., a deep reactive ion etching step using, for example, a photoresist mask, which is not illustrated) can be used to create the front side features of the extractor electrode, as illustrated in FIG. 3L. As shown in FIG. 3M, the front side of substrate 351 can be oxidized (e.g., via the formation of silicon oxide mask 356) to protect the front side features. Subsequently, as illustrated in FIG. 3N, the back side silicon oxide and silicon nitride masks can be removed. A second etching step (e.g., a second deep reactive ion etching step using, for example, a photoresist mask, which is not illustrated) can then be performed to form the back side features, such as apertures 220, as shown in FIG. 3O. The front side silicon oxide mask 356 can then be removed, as illustrated in FIG. 3P. In certain embodiments, the exposed surfaces of the resulting electrode can be coated with an electronically conductive material (e.g., a metal such as gold).

Certain of the devices described herein can be used to perform electrospraying to produce droplets and/or ions for a variety of applications. For example, certain of the systems and methods can be used to produce nanoparticles (e.g., comprising a polymer, metal, ceramic, or combinations of these and/or other materials). Certain of the systems and methods described herein can be used for the efficient high-throughput generation of ions, which can be used, for example, for mass-efficient nanosatellite electric propulsion, multiplexed focused ion beam imaging, and/or high-throughput nanomanufacturing.

The following examples are intended to illustrate certain embodiments of the present invention, but do not exemplify the full scope of the invention.

Example 1

This example describes the design, fabrication, and experimental characterization of an externally-fed, batch-microfabricated electro spray emitter array including an integrated extractor grid and carbon nanotube flow control structures. In this example, the electrospray emitter is used for low voltage and high-throughput electrospray of the ionic liquid 1-ethyl-3-methylimidazolium tetrafluoroborate (EMI-BF$_4$) in vacuum. The conformal carbon nanotube forest on the emitters provided a highly effective wicking structure to transport liquid up the emitter surface to the emission site at the tips of the emitters. Arrays containing as many as 81 emitters in 1 cm$^2$ were tested and emission currents as high as 5 microamps per emitter in both polarities were measured, with a start-up bias voltage as low as 520 V. Imprints formed on the collector electrode and per-emitter IV characteristics showed excellent emission uniformity.

The design described in this example features a hierarchical structure that brings together structures with associated characteristic lengths that span five orders of magnitude: mesoscale deflection springs for precision assembly of an extractor electrode die to an emitter array die to attain low beam interception, micro-sharp emitter tips for low voltage electrospray emission, and a nanostructured conformal CNT wicking structure that controls the flow rate fed to each emitter to attain high emitter current while maintaining good array emission uniformity.

The emitter die and extractor die are fabricated separately, and are assembled together using deflection springs that clamp onto dowel pins and provide precise alignment of the two components. The electrode separation distance is tuned using insulating spacers. In general, this distance should be small for a low start-up voltage, which is given by $$V_{start} = \sqrt{\frac{\gamma \cdot R}{\varepsilon_o}} \ln\left[\frac{2G}{R}\right] \quad [2]$$

where γ is the surface tension, R is the emitter tip radius, $\varepsilon_o$ is the permittivity of free space, and G is the distance from the emitter tip to the edge of the extractor aperture. After operation, the two electrodes are easily disassembled, cleaned and replenished with liquid.

Internally-fed emitters supply liquid to the emission site through a capillary channel; this implementation is not ideal for ion emission because capillary channels typically provide low hydraulic impedance and internally fed emitters can be prone to clogging, which causes device failure. The electrospray emitters described in this example are instead externally-fed, using a dense plasma-enhanced chemical vapor deposited (PECVD) CNT forest conformally grown on the surface of the emitters. The CNT forest acts as a wicking material to transport the ionic liquid from the base of the emitters to the emitter tips where it is ionized due to the strong electric fields present there. The ionic liquid tested in this example (EMI-BF$_4$), does not generally spread well onto the surface of an uncoated silicon emitter array; the contact angle of EMI-BF$_4$ on silicon is about 38°. However, EMI-BF$_4$ was found to be highly wetting on a CNT-coated silicon emitter surface. A drop of EMI-BF$_4$ was found to spontaneously spread across the emitter array, impregnating the surface and coating the emitter tips.

In addition to its useful wetting properties, the CNT forests were found to provide hydraulic impedance to the ionic liquid as it flowed up the surface of the emitters. Electrospray emission can occur in the ionic regime rather than a mixed ionic/droplet regime if the flow rate to the emission site is sufficiently low. A porous medium can limit the flow across the emitter surface in order to match the low flow rate for ionic emission. CNT films have been found to be particularly useful, in certain cases, because their porosity (determined by CNT diameter and packing density) is highly tunable by changing the growth parameters. The flow rate in the ionic regime is related to the measured current I by $$Q = \frac{I\langle M\rangle}{Ne\rho} \quad [3]$$

where $\langle M\rangle$ is the average molar mass of the emitted particles, N is Avogadro's number, e is the elementary charge, and $\rho$ is the density of the liquid. For EMI-BF$_4$ ($\langle M\rangle$ of about 0.2 kg/mol, $\rho$=1300 kg/m$^3$), about 5 microamps of current per emitter corresponds to Q=8×10$^{-15}$ m$^3$/s. Flow through a porous medium is governed by Darcy's law:

$$\vec{q_s} = -\frac{K_{ps}}{\mu}\nabla P \quad [4]$$

where $\vec{q_s}$ is the volumetric flow rate per unit area, $\nabla P$ is the fluid pressure gradient from the base to the tip of the emitter, $K_{ps}$ is the permeability of the medium, and $\mu$ is the fluid viscosity. The CNT film was modeled as an array of pillars in order to calculate its permeability, which is a function of the CNT diameter distribution and the packing density. The CNT growth conditions were selected to obtain a permeability of about 10$^{-13}$ m$^2$, which provided sufficient impedance for the flow rate to meet the conditions for the ionic regime.

Figure 4:
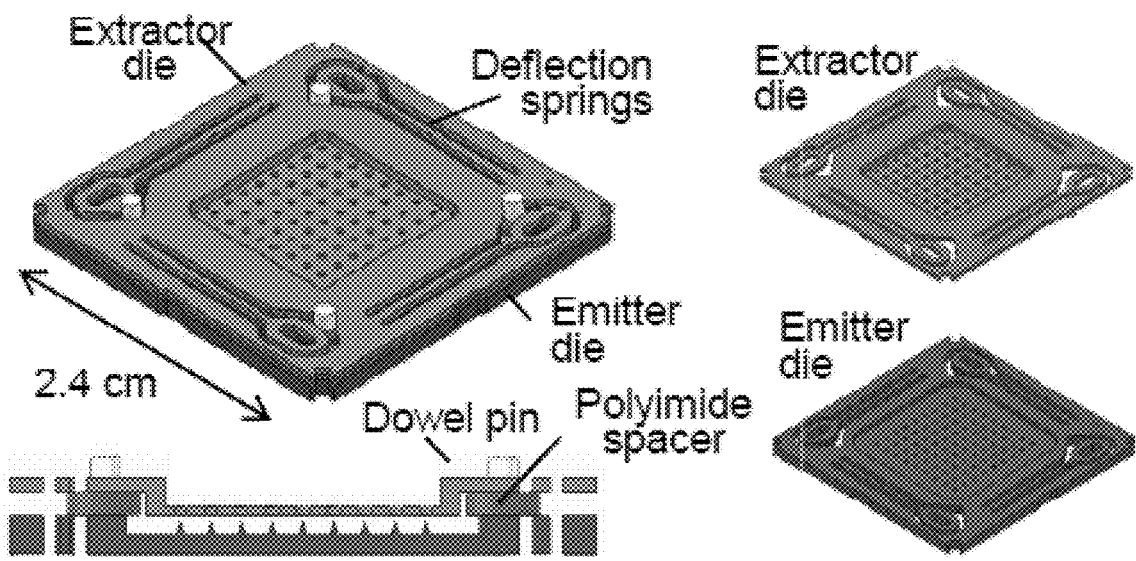
FIG. 4 is a set of exemplary schematic illustrations of an electrospraying extractor grid die, an exemplary electrospraying emitter die, and the assembly of the extractor and emitter dies into an electrospraying diode using dowel pins and insulating spacers, according to one set of embodiments.
Figure 5A:
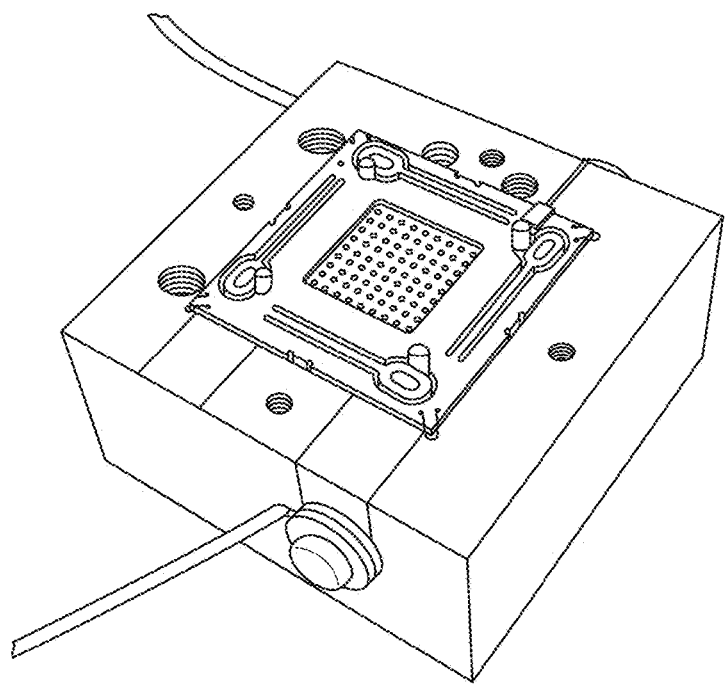
FIG. 5A is a photograph of an exemplary assembled electrospraying emitter, according to certain embodiments.
Figure 5B:
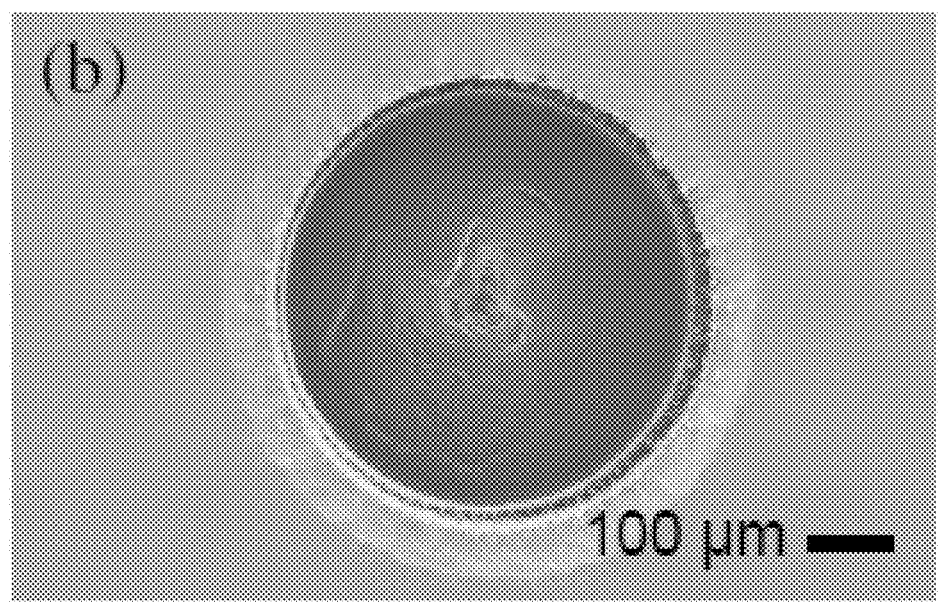
FIG. 5B is an SEM image illustrating the alignment of a protrusion tip and an extractor aperture, according to one set of embodiments.

The electrospray source included two dies, an emitter die and an extractor grid die (FIG. 4). Each die was 2.4 cm by 2.4 cm and 1 mm thick. The emitter dies contained arrays of 4, 9, 25, 49, and 81 emitters in a 1 cm$^2$ area. The emitters were 300-350 micrometers tall. The extractor grid die contained a matching array of 500 micrometer diameter circular apertures that were 250 micrometers thick. Both dies contained four deflection springs that were clamped onto dowel pins to obtain precise alignment of the two components. When the two dies were assembled (FIG. 5A), each emitter tip was aligned precisely underneath a grid aperture (FIG. 5B). Four thin polyimide spacers electrically insulated the two dies and set the emitter-to-extractor separation distance.

Figure 6A:
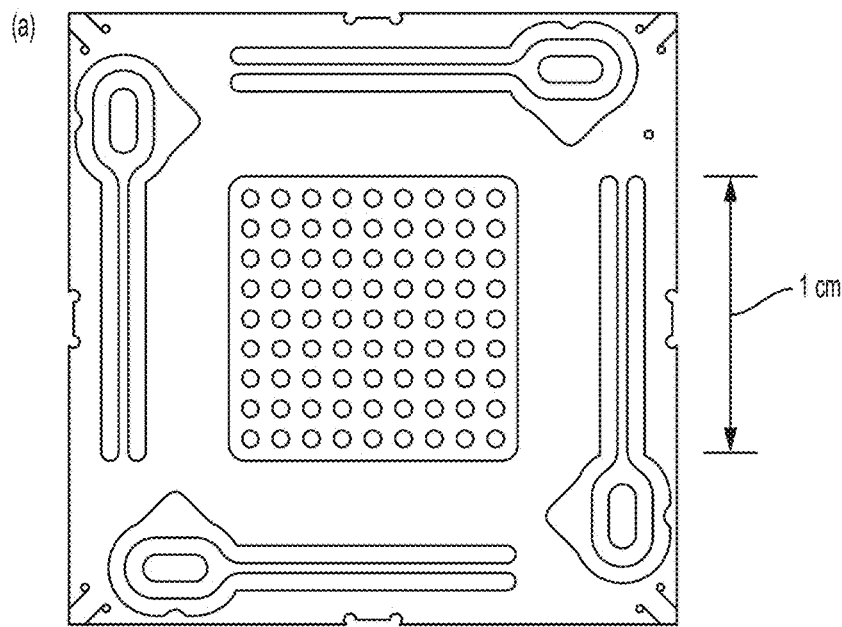
FIG. 6A is an exemplary image of an extractor grid for an array of 81 electrospraying protrusions within a 1 cm$^2$ area, according to one set of embodiments.
Figure 6B:
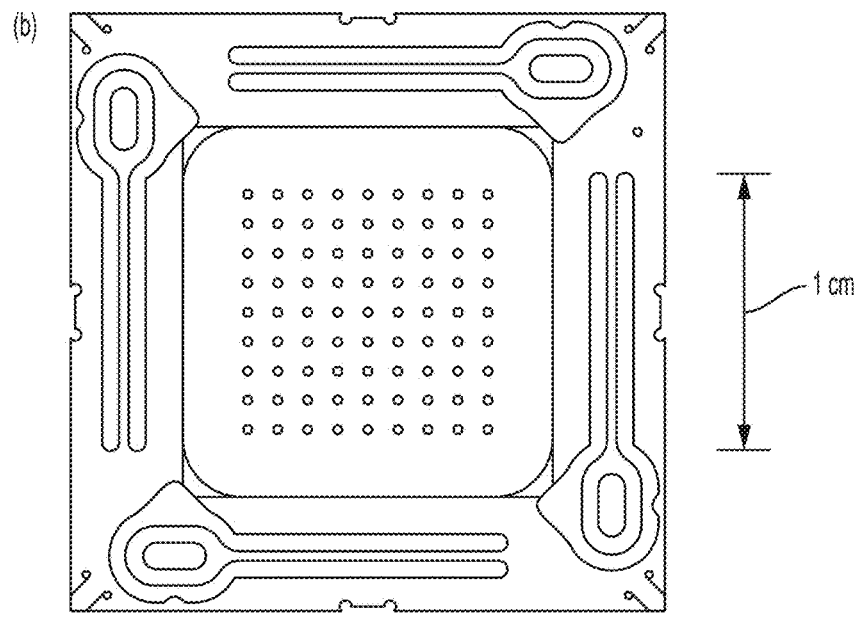
FIG. 6B an exemplary emitter die, according to one set of embodiments, for an array of 81 electrospraying protrusions within a 1 cm$^2$ area.

The extractor grid (FIG. 6A) and emitter (FIG. 6B) dies were fabricated using contact lithography starting with 1 mm thick, double-side polished doped silicon wafers. The extractor grid dies were fabricated using two (2) deep reactive-ion etching (DRIE) steps. First, the springs and a 750 micrometer-deep recess for the apertures were etched on the front side of the wafer; then, a second, back-side DRIE step was used to create 600 micrometer-deep recesses around the springs and the array of apertures. A thin film of titanium/gold was sputtered onto the grid dies to increase their electrical conductivity.

Figure 7A:
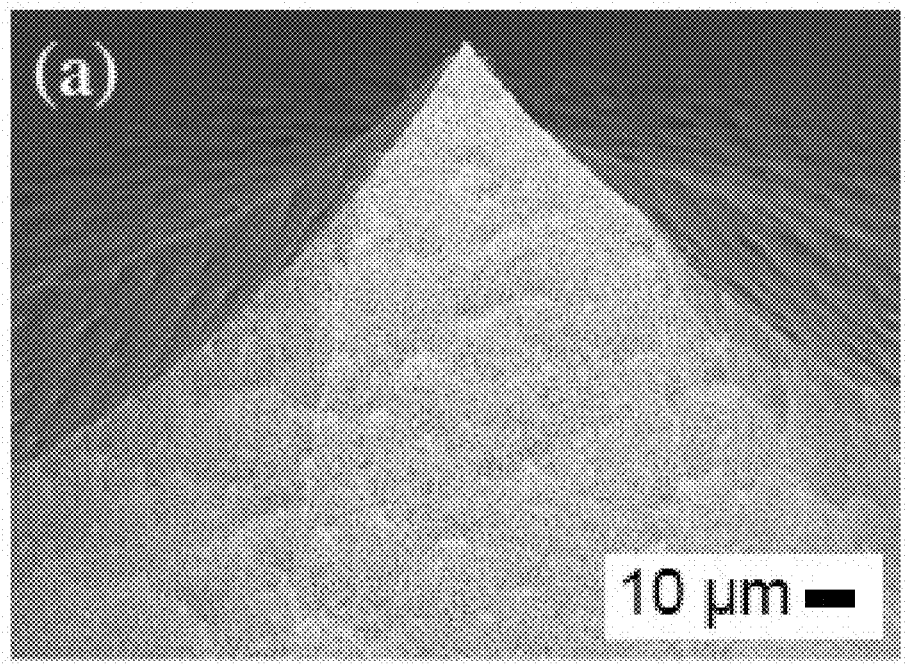
FIG. 7A is, according to certain embodiments, an exemplary SEM image of an electrospraying protrusion.
Figure 7B:
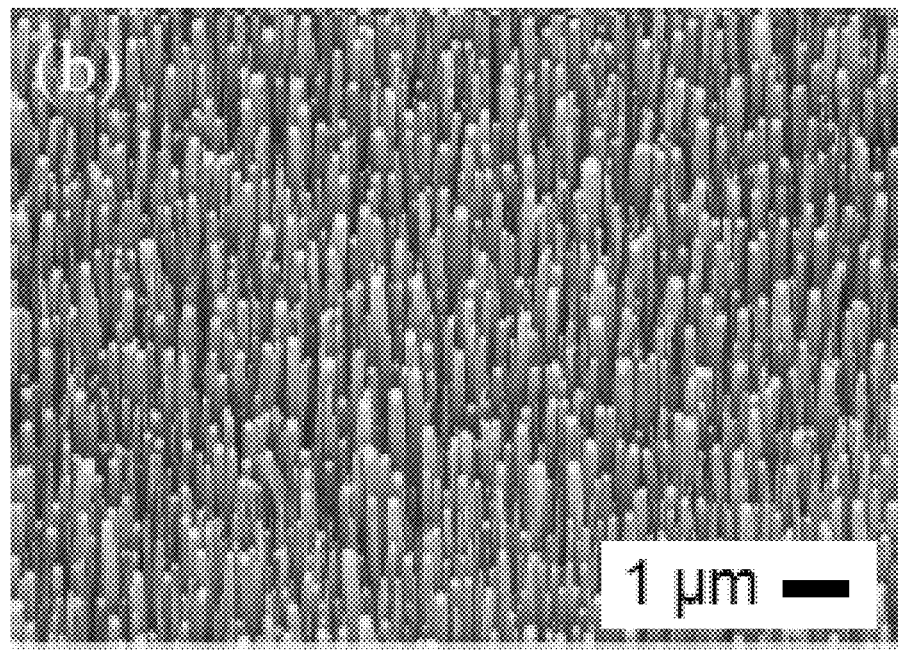
FIG. 7B is an exemplary SEM image of aligned carbon nanotubes (CNTs) on the external surface of an exemplary electrospraying protrusion, according to some embodiments.

The emitter dies were fabricated by first etching the array of emitter rips on the front side of the wafer using isotropic SF$_6$ reactive-ion etching (RIE). An array of three-notched dots, 292 micrometers in diameter, patterned in photoresist was used as the masking material. The silicon underneath the notched dots was gradually undercut during the RIE step until sharp tips were formed. Next, a DRIE step was used to etch the springs on the back side of the wafer. To complete the emitter die, a CNT film was grown on the surface of the emitters. Titanium nitride and nickel films were sputtered onto the 1 cm by 1 cm active area of the emitters using a shadow mask. CNTs were grown using plasma-enhanced chemical vapor deposition (PECVD), with ammonia and acetylene as precursors. The CNTs were about 2 micrometers tall and averaged 115 nm in diameter. The CNTs conformally coated the surface of the emitters and the entire active area of the emitter dies, as shown in FIGS. 7A-7B. The PECVD process ensured that the CNTs were firmly attached to the surfaces of the emitters; no detachment was observed after application of the ionic liquid or after repeated cleaning and reassembly of the electrospray sources.

Figure 8:
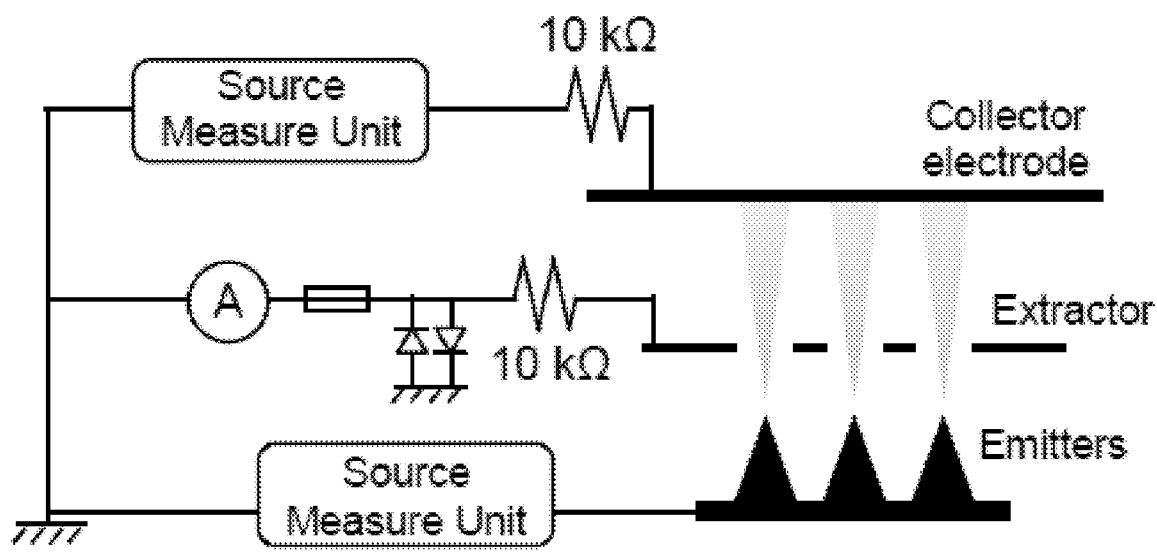
FIG. 8 is, according to one set of embodiments, a schematic of an electrospraying testing circuit.

The electrospray sources were tested in a vacuum chamber at a pressure of about 10$^{-6}$ Torr. For each test, a 0.5 microliter drop of EMI-BF$_4$ was deposited on the surface of the emitters, which spread spontaneously to coat the surface of the emitter arrays. The liquid stopped spreading once it reached the outer edge of the CNT-coated emitter active area and did not wet the surrounding silicon, thereby avoiding a potential electrical short due to liquid bridges forming between the electrodes at the dowel pins. The emitter and extractor dies were assembled together by clamping the deflection springs onto four acetal dowel pins, with polyimide spacers separating the two electrodes. A triode configuration was used to characterize the performance of the electrospray sources, in which a silicon collector electrode, placed 3.5 mm from the emitter die, was used to measure the emission current and also to collect imprints of the emission. The circuit used to test the devices is shown in FIG. 8. A Bertan 225-10R source-measure unit (SMU) was used to bias the emitter electrode up to ±2000 V, alternating the polarity to avoid a build-up of ions of either polarity. A Keithley 6485 picoammeter was used to measure the current intercepted by the extractor grid, and a Keithley 237 SMU was used to measure the collector current. A pair of diodes and a fuse were used to protect the picoammeter from current surges. The extractor electrode was held at 0 V and the collector electrode was biased up to 1000 V with opposite polarity relative to the polarity of the emitted beam (e.g., a positively biased emitter die would face a negatively biased collector). Data were collected using LabView run on a personal computer.

The performance of the electrospray sources with different array sizes was characterized. In all devices, three different phases of emission were observed: an initial over-wet phase, a steady phase, and a depletion phase. With fresh liquid applied to the emitter surface, emission was initially noisy and unstable, punctuated by current surges that were thought to be due to droplet emission. Subsequently, emission became more steady and was marked by output current as high as 5 microamps per emitter. After more than five minutes of operation, the liquid on the surface of the emitters began to deplete, and beyond a certain bias voltage the current stopped increasing. Once the liquid was replenished, the devices could be reused.

Figure 9:
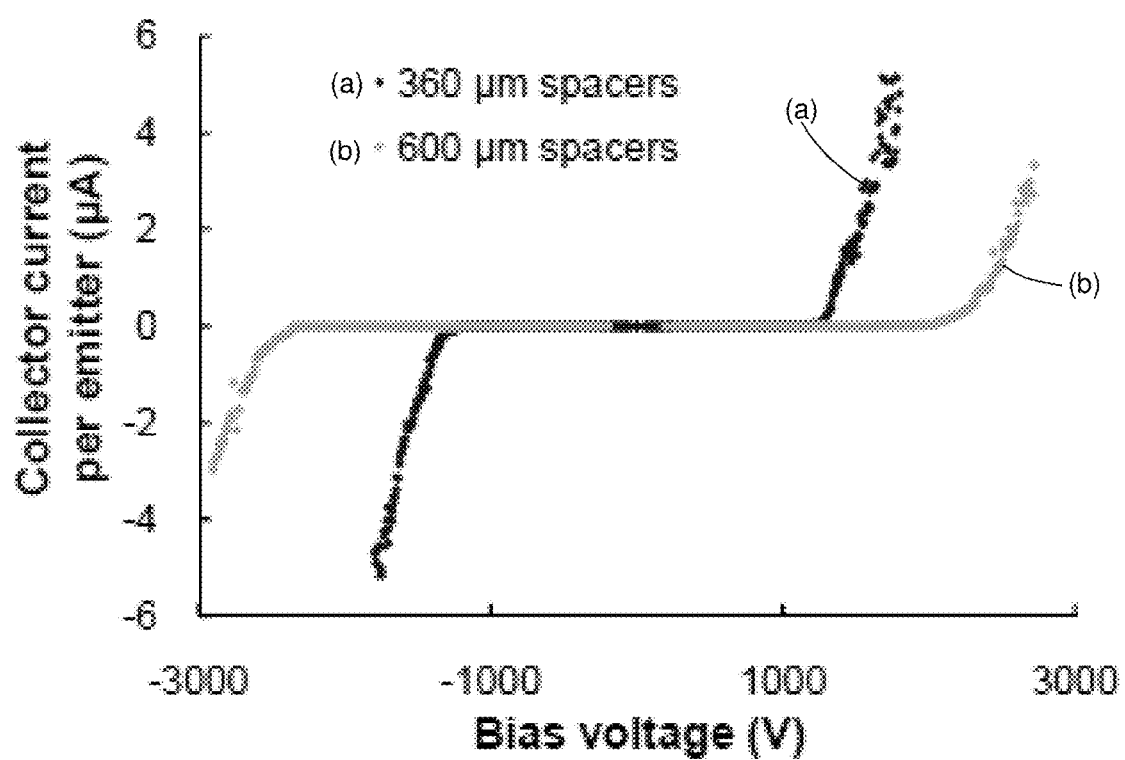
FIG. 9 is an exemplary plot of collector current per protrusion as a function of emitter-to extractor bias voltage for an emitter comprising a 7 by 7 array of protrusions, with 360 μm and 600 μm emitter-to-extractor spacing. according to one set of embodiments.

The current-voltage characteristics of a 7 by 7 emitter array during the steady emission phase are shown in FIG. 9, with 600 micrometer (G=320 micrometer) and 360 micrometer (G=250 micrometer) separation between the emitter and extractor electrodes. Thinner spacers 240 micrometers thick were also tested, but these led to liquid shorts forming between the emitter and extractor electrodes shortly after emission began. The curves showed a strong non-linear dependence between the current and the bias voltage. The emission current increased exponentially for current below 0.5 µA, and then increased essentially linearly with a slope of 90 nA/V. Assuming the start-up voltage corresponds to the voltage at which the collector current per emitter reaches $5 \times 10^{-6}$ microamps, the start-up voltage was 520 V for the 360 micrometer spacers and 1200 V for 600 micrometer spacers. It was clear that reducing the gap between the electrodes reduced the operating voltage.

Figure 10:
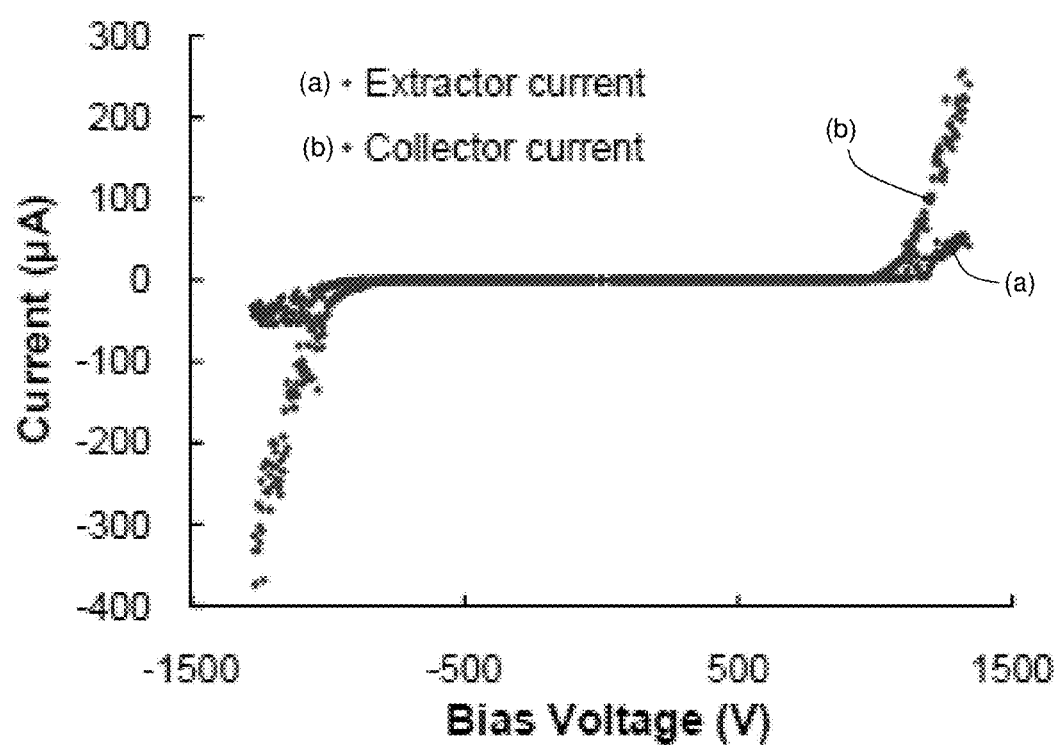
FIG. 10 is, according to certain embodiments, an exemplary plot of collector current as a function of emitter to extractor bias voltage for an emitter comprising a 9 by 9 array of emitting protrusions.

For currents above 50 nanoamps per emitter, the devices typically exhibited about 80% transmission in both polarities. The extractor and emitter current for a 9 by 9 emitter array are plotted in FIG. 10, showing an intercepted current on the extractor electrode consistently lower than 20%. This interception current could be reduced by increasing the aperture diameter (at the cost of having to increase the bias voltage), or by applying a larger bias voltage to the collector electrode.

Figure 11:
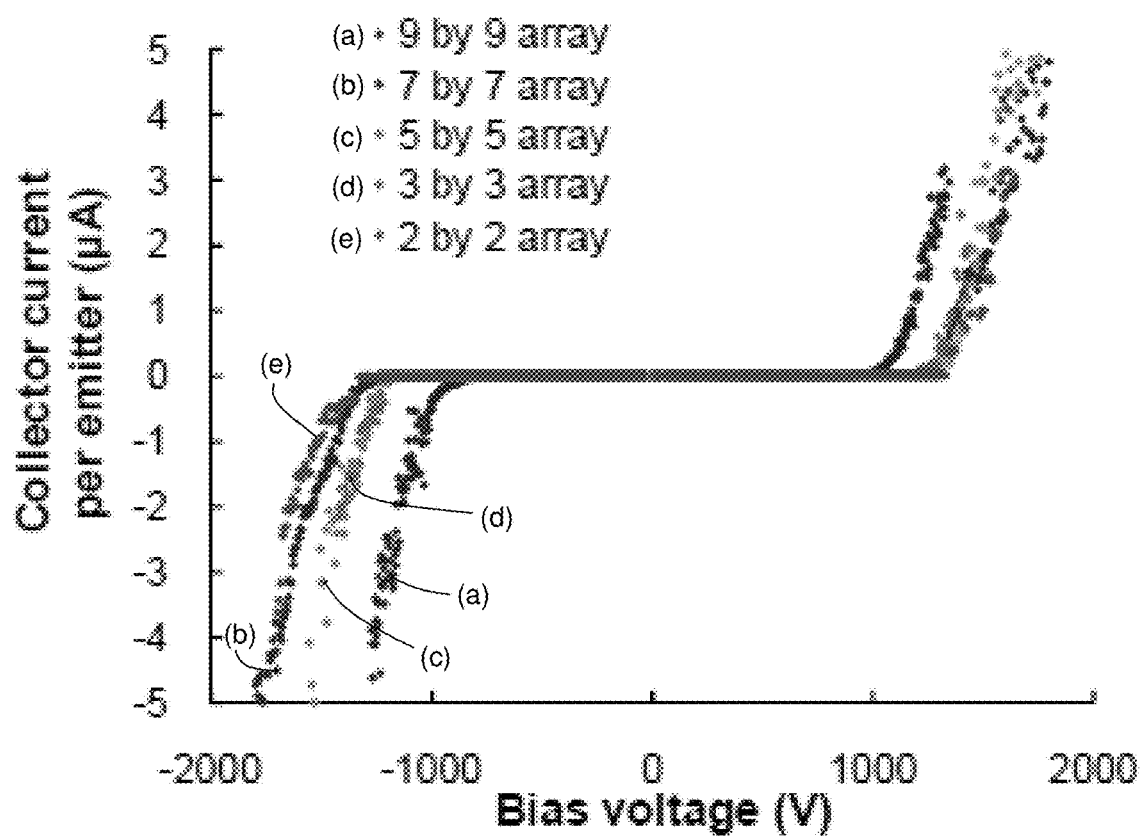
FIG. 11 is, according to one set of embodiments, an exemplary plot of collector current per protrusion as a function of emitter-to extractor bias voltage for five different emitter arrays.
Figure 12A:
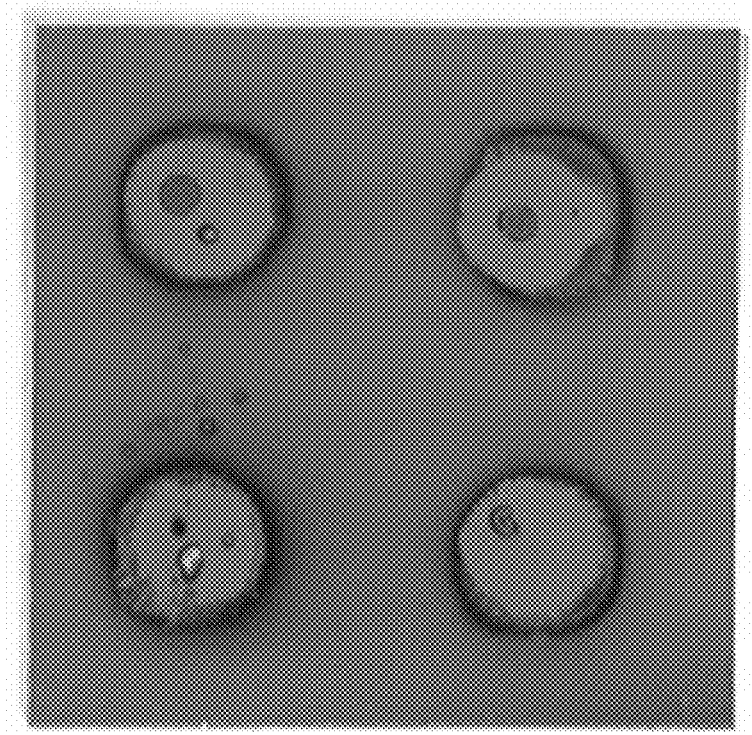
FIGS. 12A-12B are, according to one set of embodiments, exemplary electrospray imprints on a 2 cm by 2 cm silicon collector electrode for (A) an emitter comprising a 2 by 2 array of protrusions and (B) an emitter comprising a 7 by 7 array of emitter protrusions.
Figure 12B:
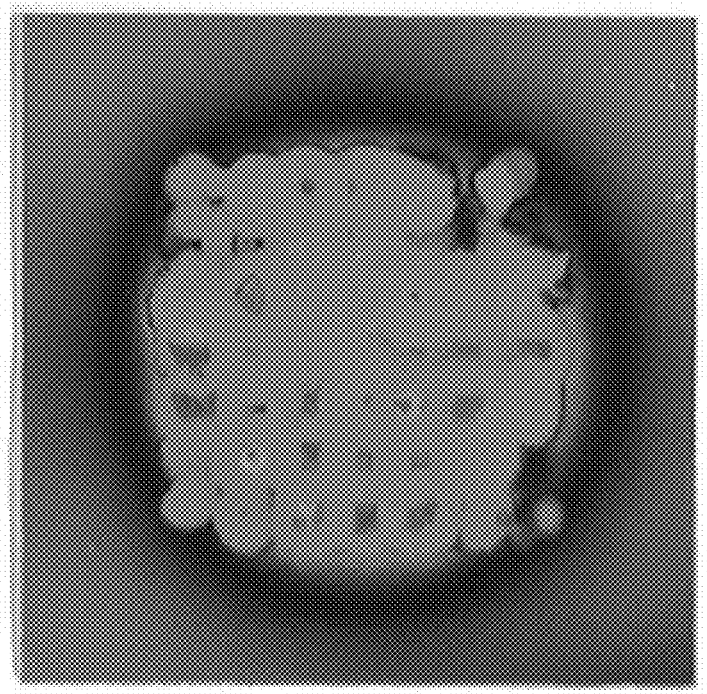

Current-voltage characteristics in the steady phase for all five emitter array sizes are shown in FIG. 11, using 360 micrometer-thick spacers between the emitter and extractor electrodes in all cases. Symmetric emission was obtained in both polarities with as much as 5 microamps per emitter tip. Similar curve shapes and slopes indicated that the emitters operated uniformly in each of the different-sized arrays. Lower start-up voltage was observed for the 9 by 9 emitter array because the etched emitters were about 50 micrometers taller than in the other arrays. Imprints (FIGS. 12A-12B) on the collector electrode confirmed that the emitters turned on uniformly across the arrays, with patterns on the collector plates that matched the emitter array layouts. To calculate the beam divergence angle, the imprints from the 2 by 2 emitter array were used as a reference. The imprint from a single emitter had a diameter of about 5.8 mm, and the collector was spaced 3.7 mm from the emitter tips, corresponding to a beam divergence semi-angle of 38°.

Example 2

Figure 13A:
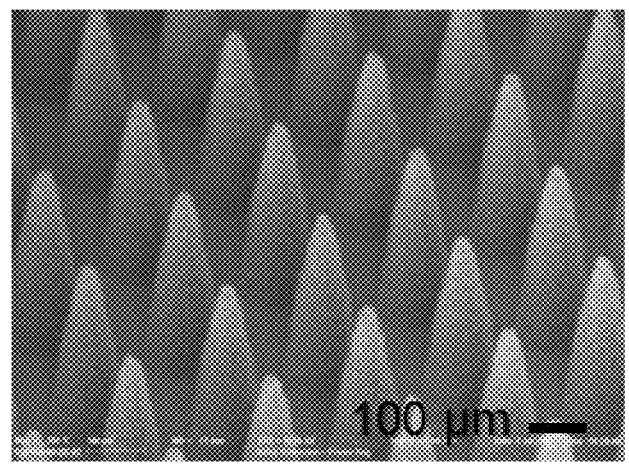
FIGS. 13A-13C are SEM images of arrays of protrusions over which carbon nanotubes are arranged.
Figure 13B:
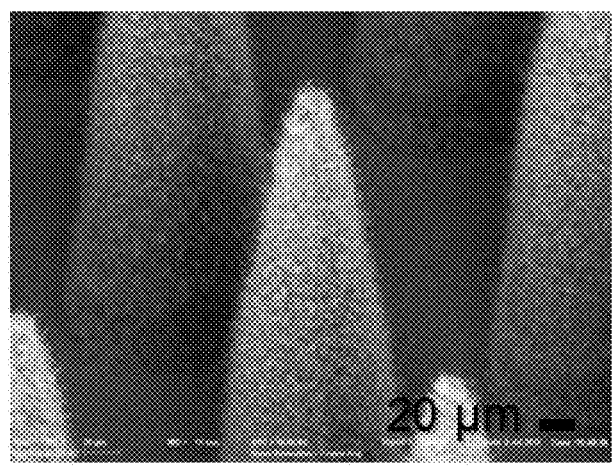
Figure 13C:
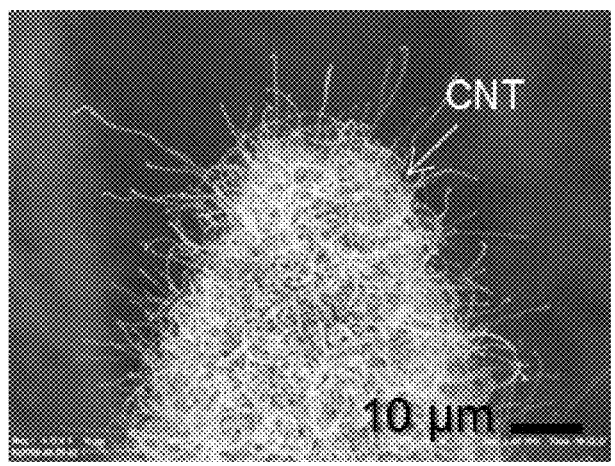

This example described the fabrication of an emitter comprising a dense array of protrusions (1900 emitters in 1 cm$^2$) and an electrospraying system using the same. The emitter was fabricated using a similar process as outlined in Example 2, using alternating RIE and DRIE steps (rather than DRIE steps alone). The masking material included an array of three-notched dots, patterned in photoresist. The silicon underneath the notched dots was gradually undercut until sharp tips were formed. Next, a DRIE step was used to etch springs on the back side of the wafer. To complete the emitter dies, a CNT forest was grown on the surface of the emitters. A 50 nm thick titanium nitride film and a 20 nm thick nickel film were sputtered onto the 1 cm by 1 cm active area of the emitting protrusions using a shadow mask. CNTs were grown using a plasma enhanced chemical vapor deposition (PECVD) technique with ammonia and acetylene as precursor gases. The CNTs were 2 microns tall, averaged 115 nm in diameter, and conformally coated the surface of the protrusions and the entire active area of the emitter dies. SEM images of the resulting protrusion arrays are shown in FIGS. 13A-13C.

Figure 14:
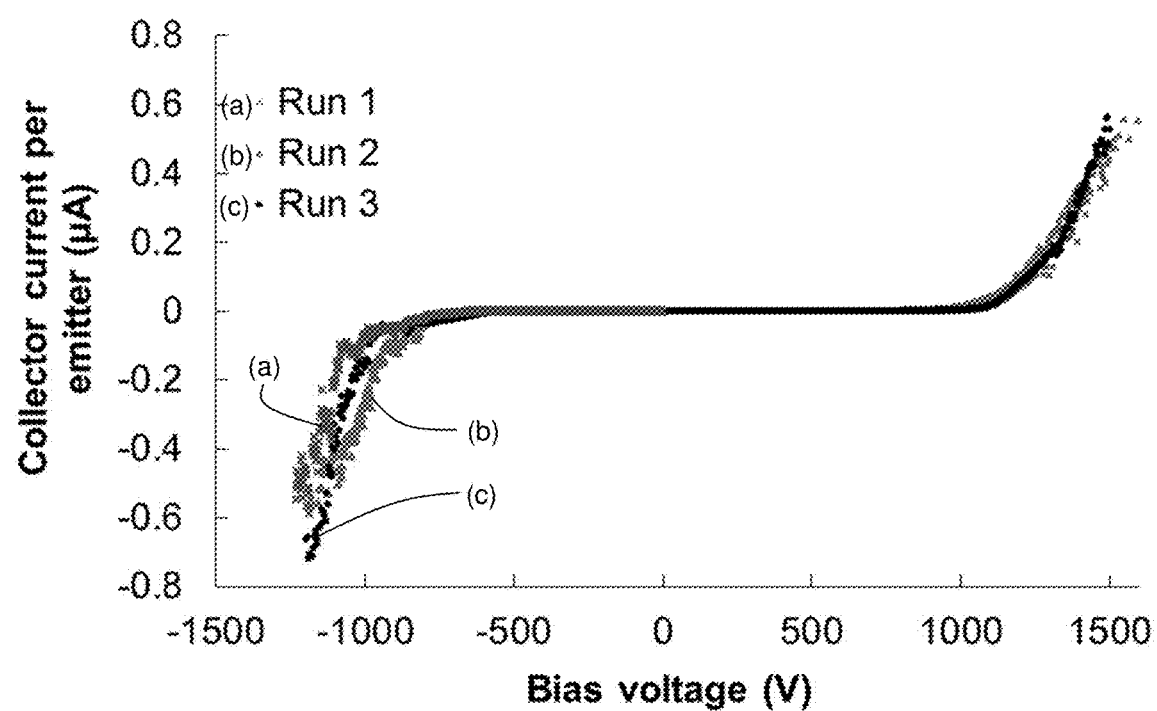
FIG. 14 is an exemplary plot, according to one set of embodiments, of collector current per protrusion as a function of emitter-to extractor bias voltage for an emitter comprising an array of 1900 protrusions per cm$^2$.

Current-voltage characteristics in the steady phase for the array of 1900 emitters in 1 cm$^2$ are shown in FIG. 14, using 360 micrometer thick spacers between the emitter and extractor electrodes. Symmetric emission was obtained in both polarities with as much as 0.5 microamps per emitting protrusion tip. The average start-up voltage was 700V. Maximum output current of 1 mA was measured, corresponding to an output current density of 1 mA/cm$^2$. The imprints on the collector electrodes indicated uniform emission across the emitter array.

The following applications are hereby incorporated by reference in their entirety for all purposes: U.S. Provisional Patent Application Ser. No. 61/827,905, filed May 28, 2013, and entitled "High-Throughput Manufacturing of Nanofibers Using Massive Arrays of Electrospinning Emitters"; U.S. Provisional Patent Application Ser. No. 61/827,893, filed May 28, 2013, and entitled "Bio-Inspired Electrospray Emitter Arrays for High-Throughput Ionization of Liquids"; and a U.S. Non-Provisional patent application, filed on Jun. 14, 2013, and entitled "Electrically-Driven Fluid Flow and Related Systems and Methods, Including Electro spinning and Electro spraying Systems and Methods."

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An emitter configured for use in an electrospraying device, comprising:
   an array of protrusions extending from an emitter substrate, at least a portion of the protrusions in the array comprising a plurality of elongated nanostructures extending from one or more external surfaces of the protrusions, wherein the nanostructures are arranged between the bases of the protrusions and the tips of the protrusions and are configured to transport fluid from bases of the protrusions to tips of the protrusions at least in part via capillary forces.

2. The emitter of claim 1, wherein at least a portion of the elongated nanostructures are nanotubes.

3. The emitter of claim 2, wherein at least a portion of the elongated nanostructures are carbon nanotubes and/or inorganic nanotubes.

4. The emitter of claim 1, wherein at least a portion of the elongated nanostructures are nanofibers.

5. The emitter of claim 4, wherein at least a portion of the elongated nanostructures are carbon nanofibers and/or silicon carbide nanofibers.

6. The emitter of claim 1, wherein the elongated nanostructures are substantially aligned.

7. The emitter of claim 1, wherein at least a portion of the emitter substrate and/or the protrusions are formed of a semiconductor.

8. The emitter of claim 1, wherein at least a portion of the protrusions have maximum cross-sectional dimensions of at least about 1 micron.

9. The emitter of claim 1, wherein the array comprises at least 10 protrusions having an aerial density of at least about 10 protrusions/cm$^2$.

10. The emitter of claim 9, wherein the protrusions have an aerial density of between about 10 protrusions/cm$^2$ and about 100,000 protrusions/cm$^2$.

11. The emitter of claim 1, wherein at least a portion of the protrusions do not contain internal fluid passageways.

12. A system, comprising: the emitter of claim 1; and
    an electrode;
    wherein, when a voltage is applied across the emitter and electrode and the emitter is exposed to a fluid, droplets of the fluid are emitted from at least a portion of the protrusions of the emitter toward the electrode.

13. A method, comprising applying a voltage across the emitter of claim 1 and an electrode such that fluid positioned between the emitter and the electrode is emitted from at least a portion of the protrusions of the emitter toward the electrode.

14. The emitter of claim 1, wherein at least one of the protrusions in the array comprises at least about 100 elongated nanostructures extending from the one or more external surfaces of the protrusion.

15. The emitter of claim 6, wherein the substantially aligned elongated nanostructures are non-parallel to the one or more external surfaces of the protrusion from which the substantially aligned elongated nanostructures extend.

16. The emitter of claim 6, wherein the substantially aligned elongated nanostructures are substantially perpendicular to the one or more external surfaces of the protrusion from which the substantially aligned elongated nanostructures extend.

17. The emitter of claim 1, comprising an intermediate material positioned between the elongated nanostructures and the protrusions.

18. The emitter of claim 17, wherein the intermediate material comprises a catalyst capable of catalyzing the formation of the elongated nanostructures.

19. The emitter of claim 1, wherein the elongated nanostructures comprise at least one of nanotubes, nanofibers, nanowires, nanopillars, and nanowhiskers.

* * * * *